(12) United States Patent
Pettigrew et al.

(10) Patent No.: US 9,370,898 B2
(45) Date of Patent: Jun. 21, 2016

(54) CONNECTING METHOD

(71) Applicant: JOINLOCK PTY LTD., Tennyson, Queensland (AU)

(72) Inventors: John Hamish Alexander Pettigrew, Tennyson (AU); Thomas David Percy, Windsor (AU)

(73) Assignee: JOINLOCK PTY LTD., Tennyson, Queensland (AU)

( * ) Notice: Subject to any disclaimer, the term of this patent is extended or adjusted under 35 U.S.C. 154(b) by 72 days.

(21) Appl. No.: 13/888,793

(22) Filed: May 7, 2013

(65) Prior Publication Data

US 2013/0239391 A1   Sep. 19, 2013

Related U.S. Application Data

(63) Continuation-in-part of application No. PCT/AU2011/001463, filed on Nov. 11, 2011.

(30) Foreign Application Priority Data

Nov. 11, 2010 (AU) ............................. 2010905008
Apr. 6, 2011 (AU) ............................. 2011901274
May 9, 2012 (AU) ............................. 2012901891
Sep. 19, 2012 (AU) ............................. 2012227192

(51) Int. Cl.
*F16B 2/02* (2006.01)
*F16B 7/04* (2006.01)
(Continued)

(52) U.S. Cl.
CPC ................ *B29C 65/76* (2013.01); *B65D 45/32* (2013.01); *B65D 55/02* (2013.01); *F16B 5/0084* (2013.01);
(Continued)

(58) Field of Classification Search
CPC ....... B23P 11/00; B29C 65/76; B29C 66/721; B29C 66/5229; B29C 66/1312; B29C 65/562; B29C 66/71; B29C 66/4322; B29C 66/542; B29C 66/7212; B29C 66/43; B29C 66/221; B29C 66/1142; B29C 66/5221; B29C 66/432; F16B 5/0084; F16B 5/0664; F16B 5/0642; F16L 9/22; F16L 23/04; F16L 9/17; F16L 37/1225; Y10T 29/49826; Y10T 29/49954; B29K 2309/08; B29K 2307/04; B29K 2277/10; B29K 2075/00; B29K 2300/00; B29K 2023/10; B65D 55/02; B65D 45/32
USPC .............. 29/428, 525.01, 525.05, 33 R, 33.2; 403/313, 359.1, 359.5, DIG. 1
See application file for complete search history.

(56) References Cited

U.S. PATENT DOCUMENTS 1,063,318 A    6/1913  Bartels
3,253,842 A *  5/1966  Rabe .............................. 285/81
(Continued)

FOREIGN PATENT DOCUMENTS

AU    2009248444    1/2010
WO    WO 2008/042105    4/2008
(Continued)

OTHER PUBLICATIONS

International Search Report for PCT/AU2011/001463 mailed Feb. 14, 2012.

*Primary Examiner* — Essama Omgba
*Assistant Examiner* — Darrell C Ford
(74) *Attorney, Agent, or Firm* — Nixon & Vanderhye P.C.

(57) ABSTRACT

A method for connecting at least a first component (2) and a second component (3) together, wherein each component (2, 3) comprises at least one key arrangement extending along the component (2, 3) and keys (5, 6) of the key arrangement are spaced apart from one another. The method comprises the steps of: aligning the key arrangements of the components (2, 3) such that aligned keys (5, 6) of the key arrangements extend generally in line with a common axis (15) or ensuring alignment of the key arrangements such that aligned keys (5, 6) of the key arrangements extend generally in line with a common axis (15); and extending a key connector (4) comprising at least one longitudinal keyway passage (8) over the aligned keys (5, 6) generally in line with the common axis (15) so that the keys (5, 6) extend within the keyway passage (8), are retained by the key connector (4), and the first and second components (2, 3) are clamped together to form an assembly (1).

14 Claims, 32 Drawing Sheets

(51) Int. Cl.
*F16D 1/02* (2006.01)
*B23P 11/00* (2006.01)
*B23P 17/00* (2006.01)
*B21B 15/00* (2006.01)
*B29C 65/76* (2006.01)
*F16L 9/17* (2006.01)
*F16L 9/22* (2006.01)
*F16L 23/04* (2006.01)
*F16L 37/12* (2006.01)
*F16B 5/00* (2006.01)
*B65D 45/32* (2006.01)
*B65D 55/02* (2006.01)
*B29C 65/56* (2006.01)
*B29C 65/00* (2006.01)
*F16B 5/06* (2006.01)

(52) U.S. Cl.
CPC ... *F16L 9/17* (2013.01); *F16L 9/22* (2013.01); *F16L 23/04* (2013.01); *F16L 37/1225* (2013.01); *B29C 65/562* (2013.01); *B29C 66/1142* (2013.01); *B29C 66/1312* (2013.01); *B29C 66/221* (2013.01); *B29C 66/43* (2013.01); *B29C 66/432* (2013.01); *B29C 66/4322* (2013.01); *B29C 66/5221* (2013.01); *B29C 66/5229* (2013.01); *B29C 66/542* (2013.01); *B29C 66/71* (2013.01); *B29C 66/721* (2013.01); *B29C 66/7212* (2013.01); *F16B 5/0642* (2013.01); *F16B 5/0664* (2013.01); *Y10T 29/49826* (2015.01); *Y10T 29/49954* (2015.01)

(56) References Cited

U.S. PATENT DOCUMENTS

| | | | |
|---|---|---|---|
| 3,836,217 A * | 9/1974 | Shiina | 312/107 |
| 4,346,428 A | 8/1982 | Gale | |
| 4,601,495 A * | 7/1986 | Webb | 285/112 |
| 4,649,679 A * | 3/1987 | Arens | 52/181 |
| 5,288,114 A * | 2/1994 | Crane | F16L 37/252 285/370 |
| 5,584,156 A * | 12/1996 | Lange | F16B 5/004 24/20 R |
| 5,782,499 A | 7/1998 | Gfrerer et al. | |
| 5,857,713 A | 1/1999 | Horimoto | |
| 5,878,907 A | 3/1999 | Graf | |
| 5,984,566 A * | 11/1999 | Blaha | 403/364 |
| 6,070,912 A | 6/2000 | Latham | |
| 6,217,251 B1 * | 4/2001 | Kato et al. | 403/341 |
| 6,382,680 B1 | 5/2002 | Horimoto | |
| 7,044,507 B2 | 5/2006 | Ricard | |
| 7,798,535 B2 | 9/2010 | Calhoun | |
| 7,798,537 B2 | 9/2010 | Nakamura et al. | |
| 7,828,338 B2 | 11/2010 | Kertesz | |
| 8,287,005 B2 | 10/2012 | Leslie et al. | |
| 8,490,359 B2 * | 7/2013 | Perotti et al. | 52/589.1 |
| 2002/0158484 A1 * | 10/2002 | Delavalle | F16B 5/004 296/29 |
| 2006/0171776 A1 * | 8/2006 | Luft | F16B 7/0406 403/267 |
| 2006/0278633 A1 | 12/2006 | Cacace | |
| 2009/0218809 A1 | 9/2009 | Tabanelli | |
| 2011/0193341 A1 | 8/2011 | Richter | |

FOREIGN PATENT DOCUMENTS

| | | |
|---|---|---|
| WO | 2008/151368 | 12/2008 |
| WO | WO 2008/151368 | 12/2008 |
| WO | 2012/061900 | 5/2012 |
| WO | WO 2012/061900 | 5/2012 |

* cited by examiner

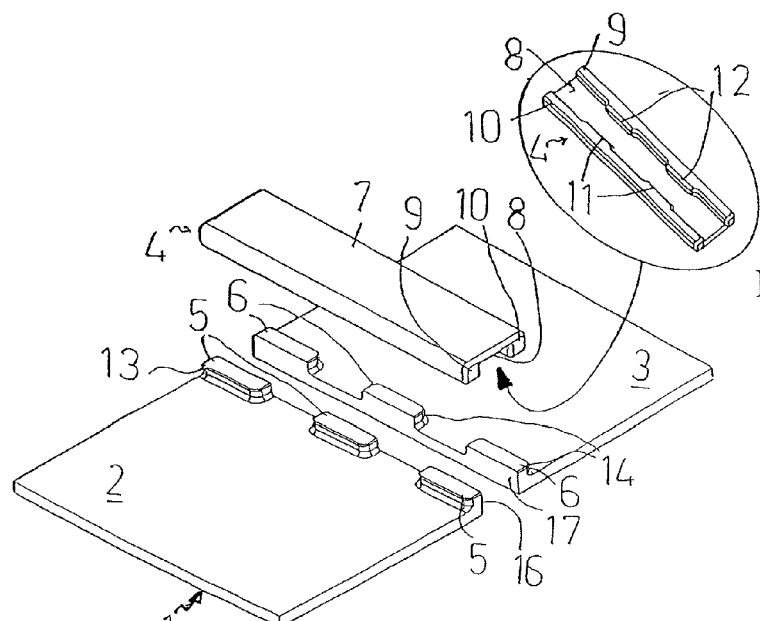
Fig. 3
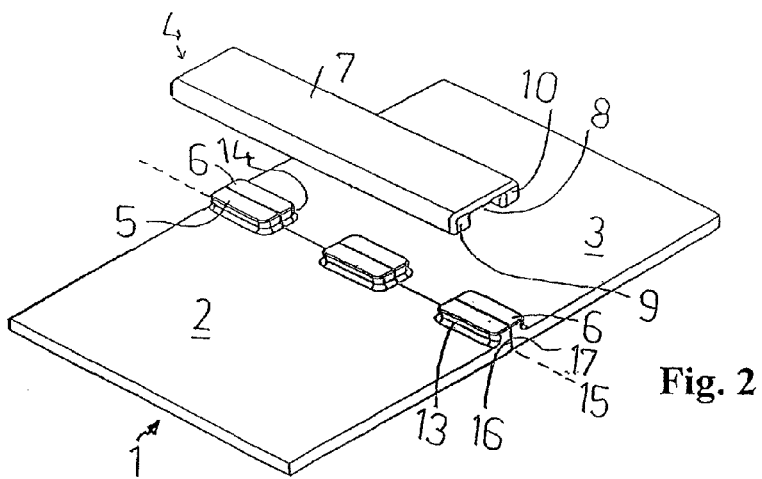
Fig. 1
Fig. 2
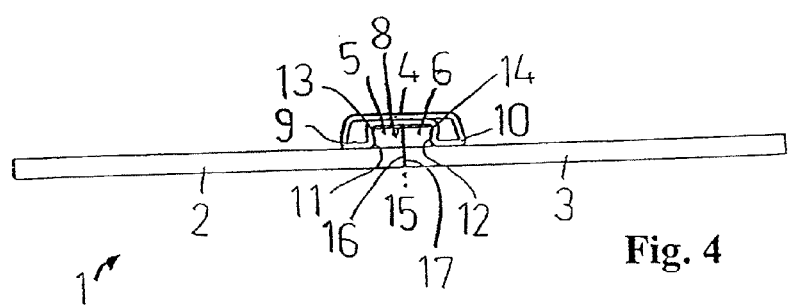
Fig. 4

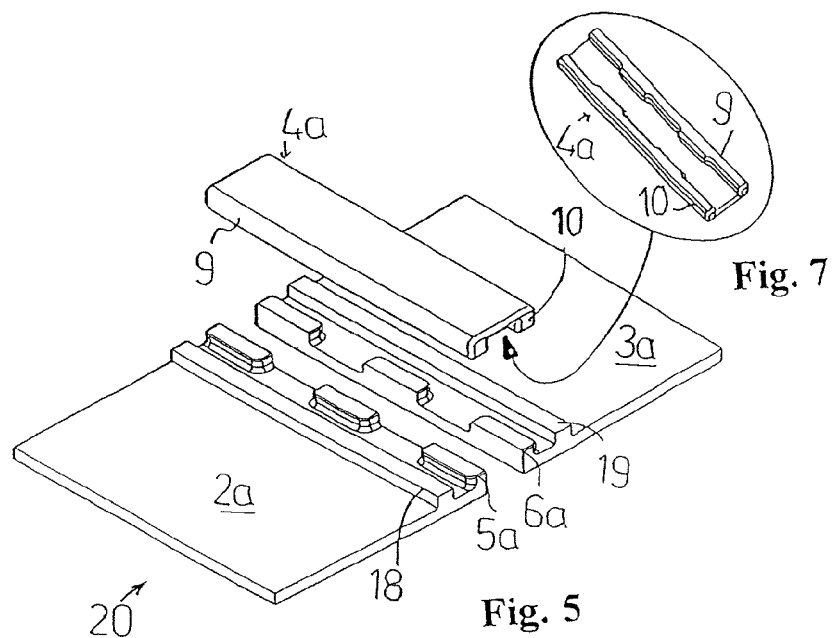
Fig. 7
Fig. 5
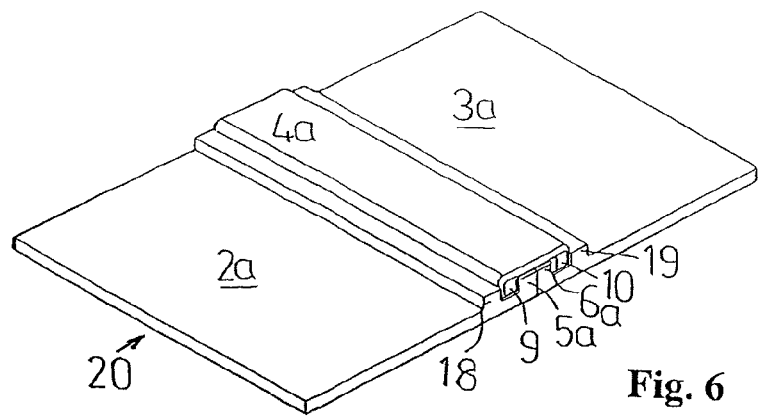
Fig. 6
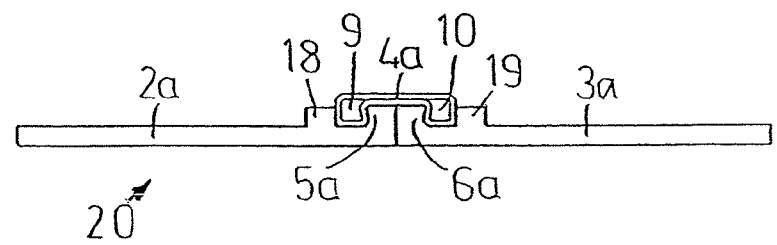
Fig. 8

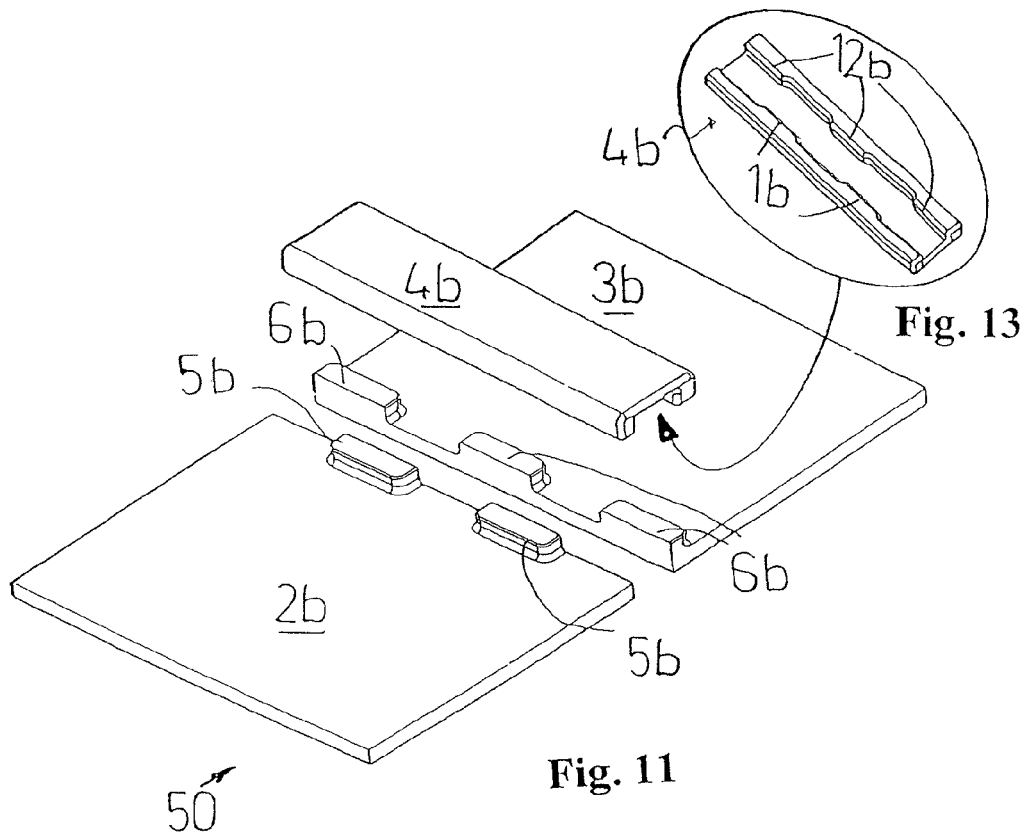
Fig. 13
Fig. 11
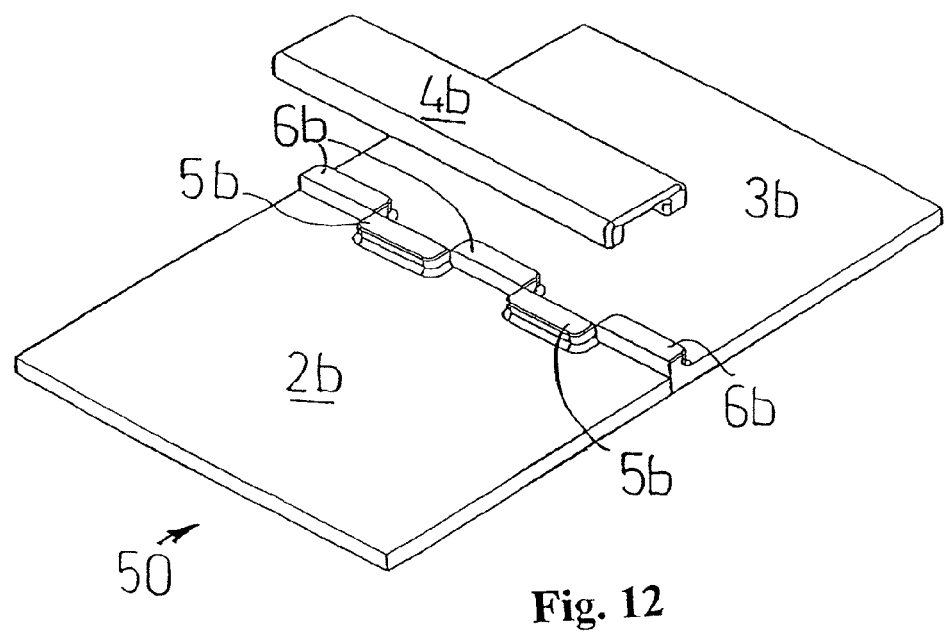
Fig. 12

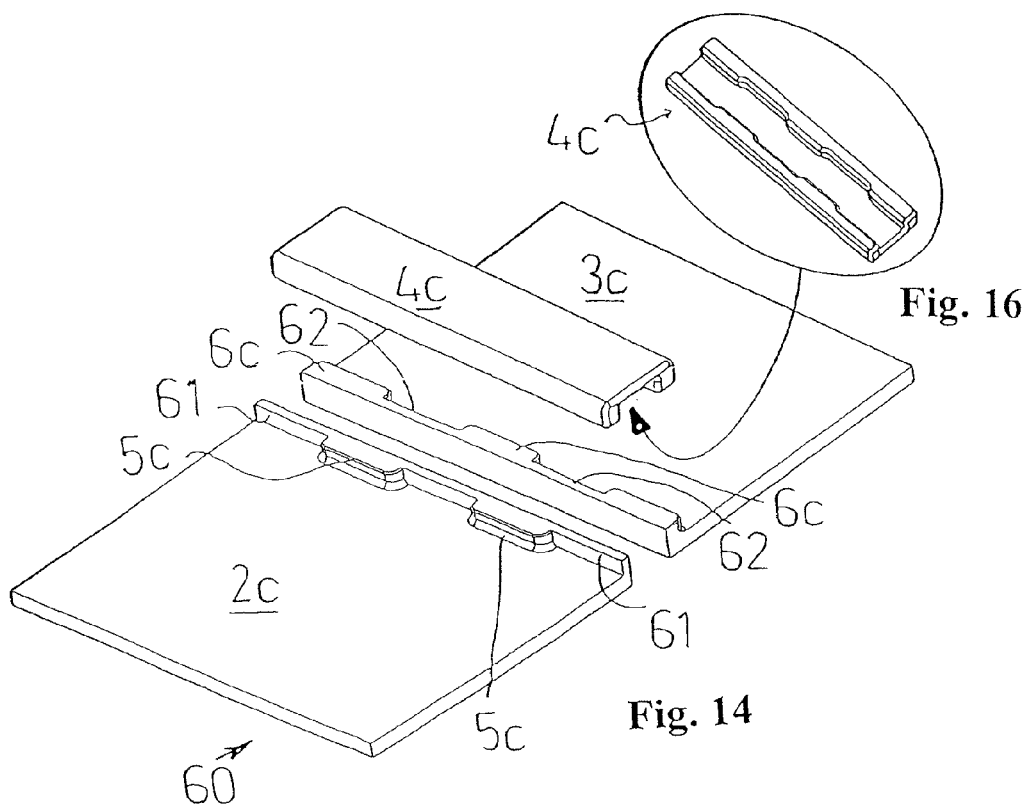
Fig. 16
Fig. 14
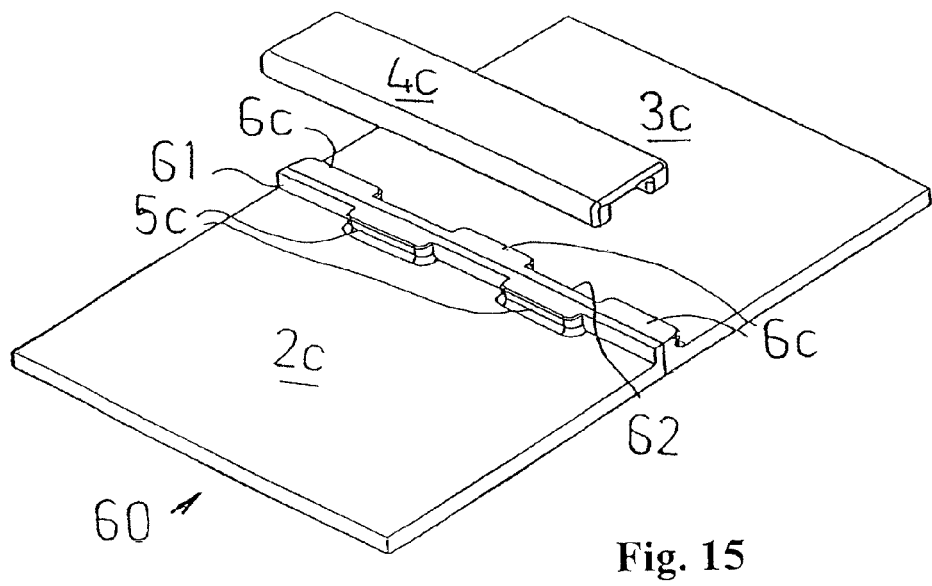
Fig. 15

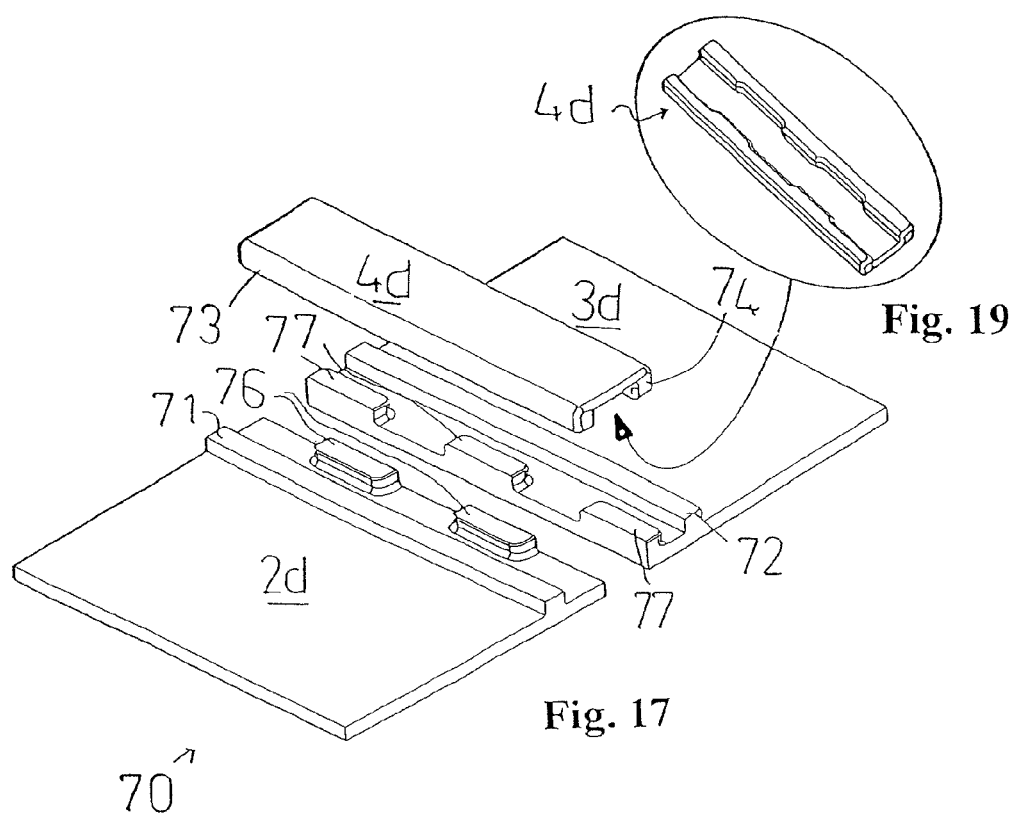
Fig. 19
Fig. 17
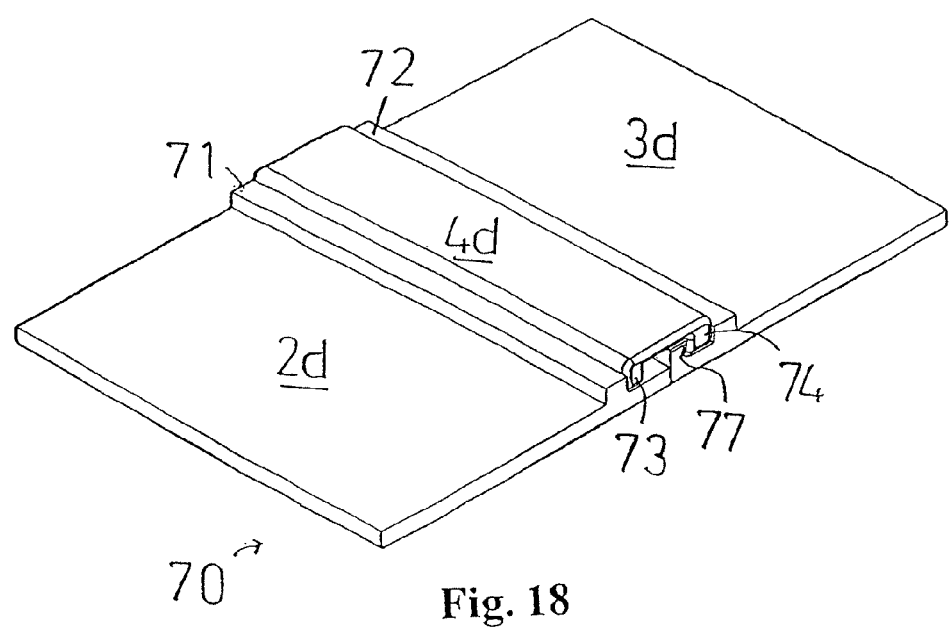
Fig. 18

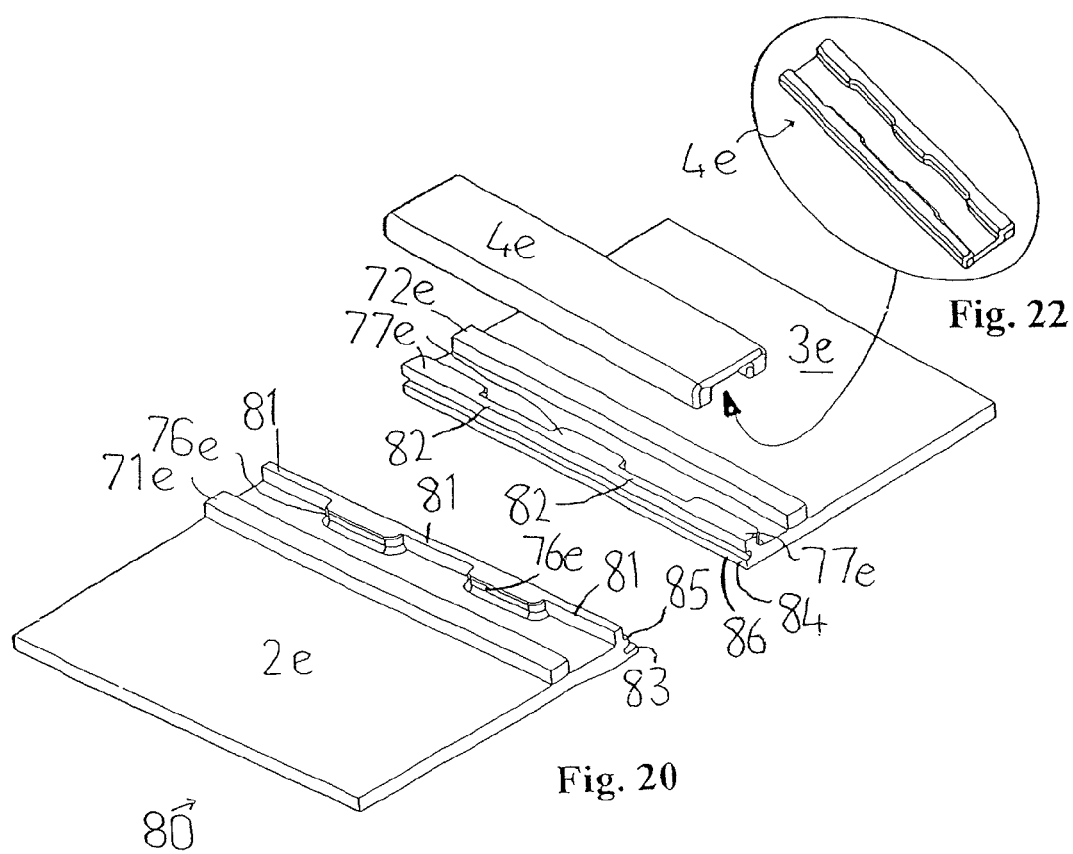
Fig. 22
Fig. 20
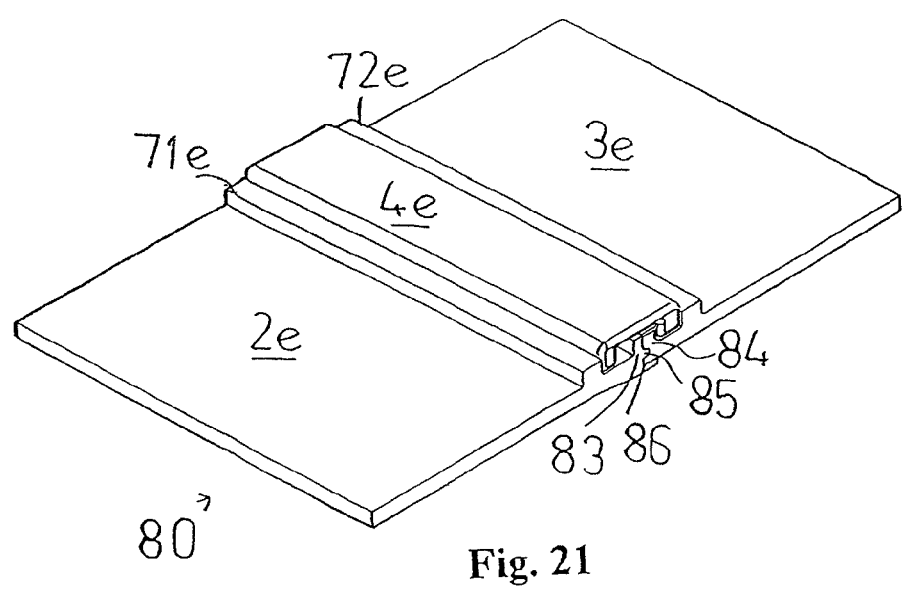
Fig. 21

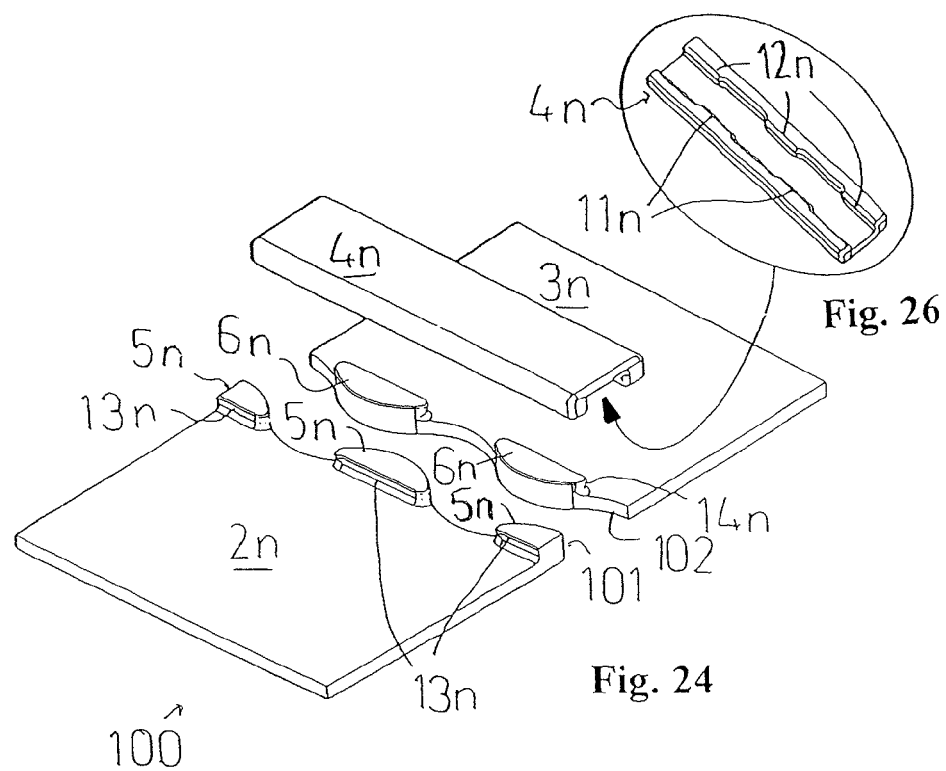
Fig. 26
Fig. 24
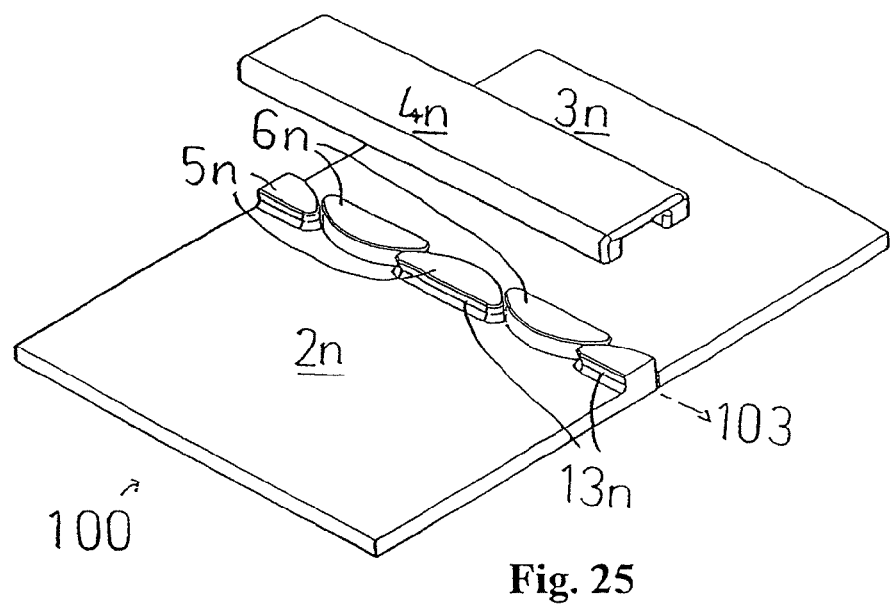
Fig. 25

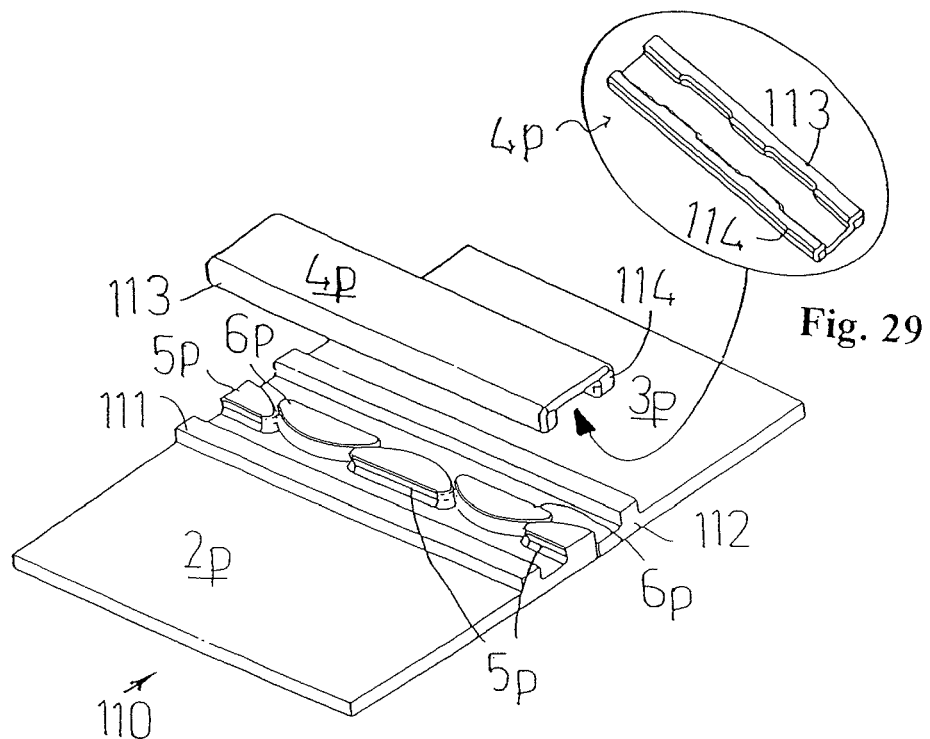
Fig. 29
Fig. 27
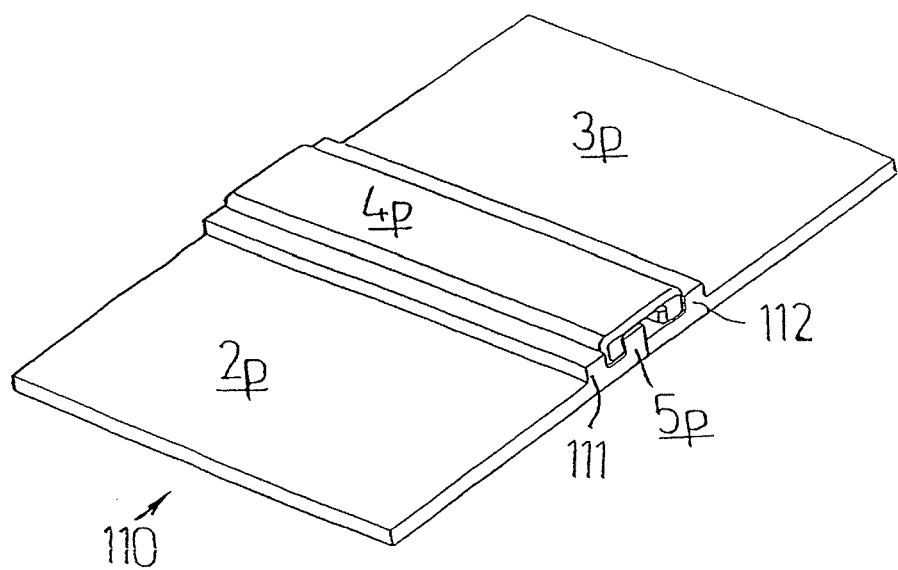
Fig. 28

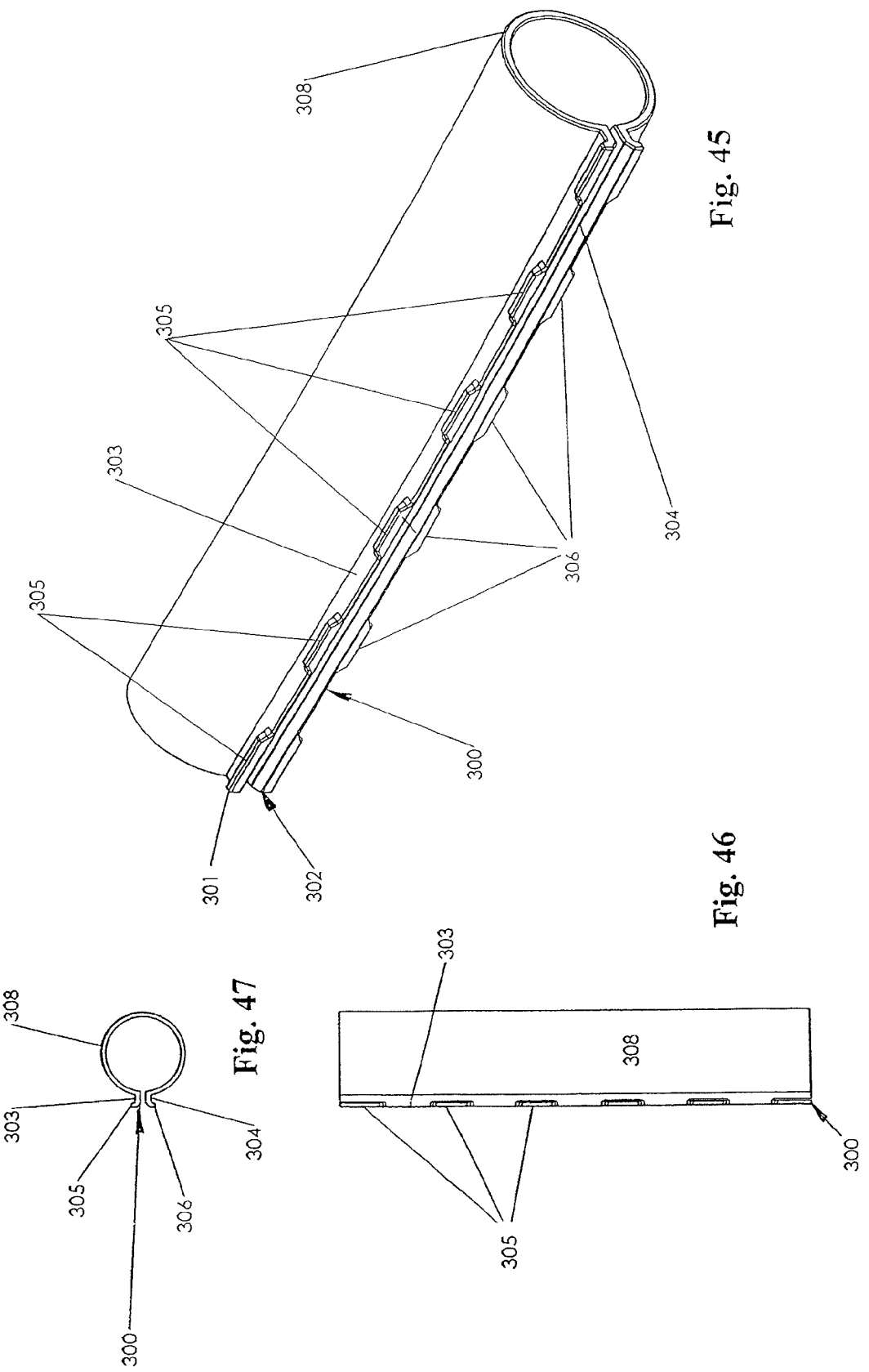

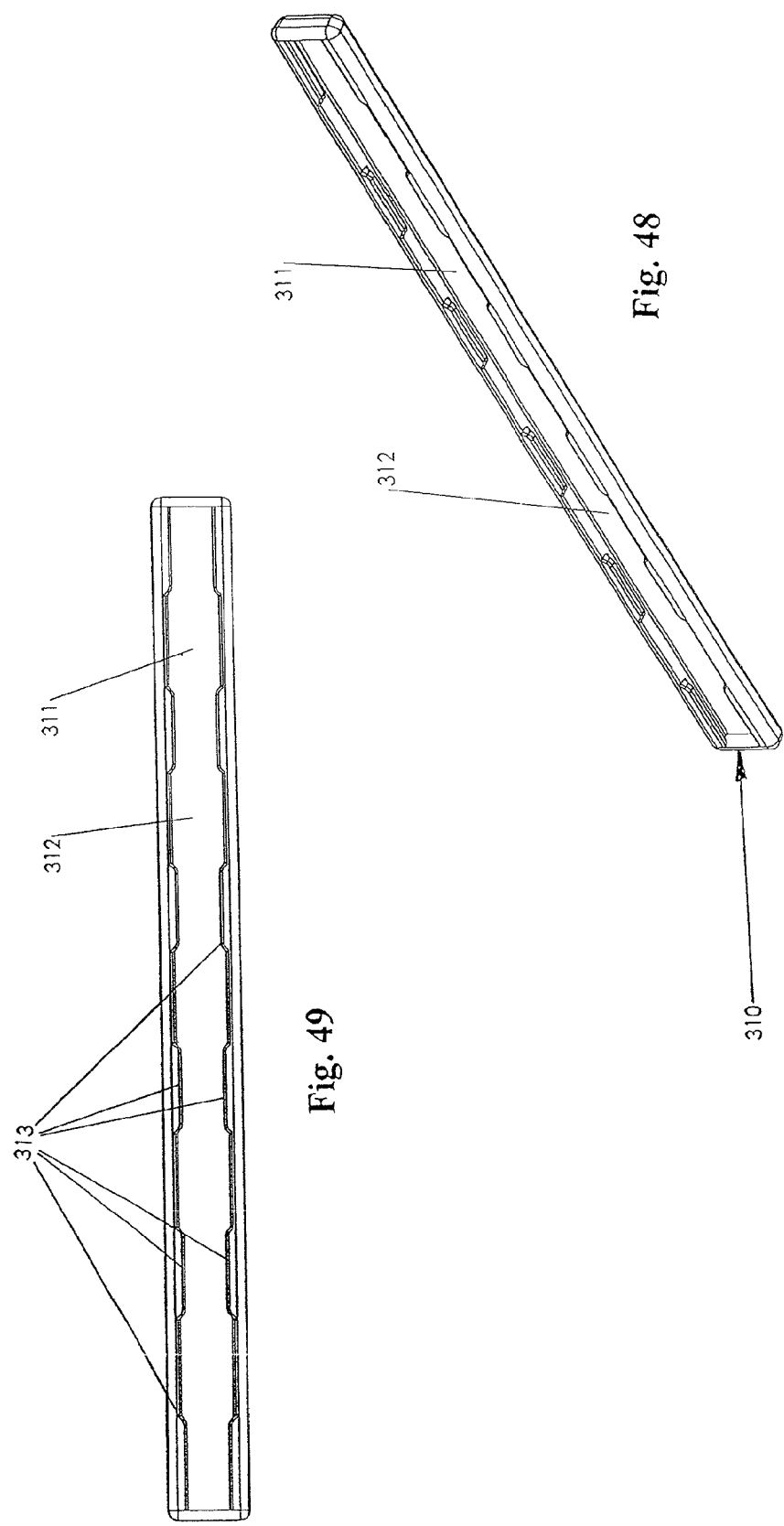

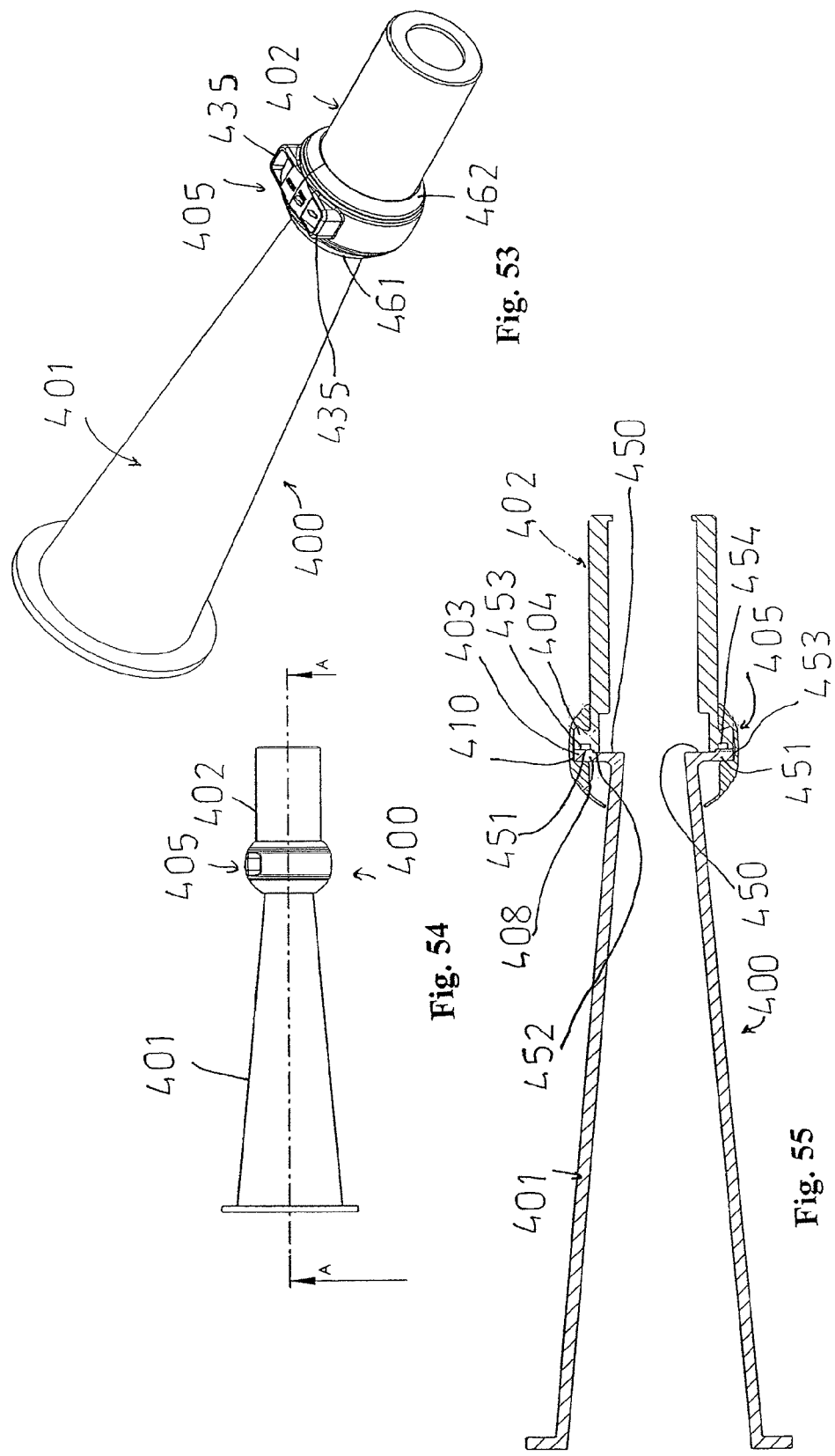

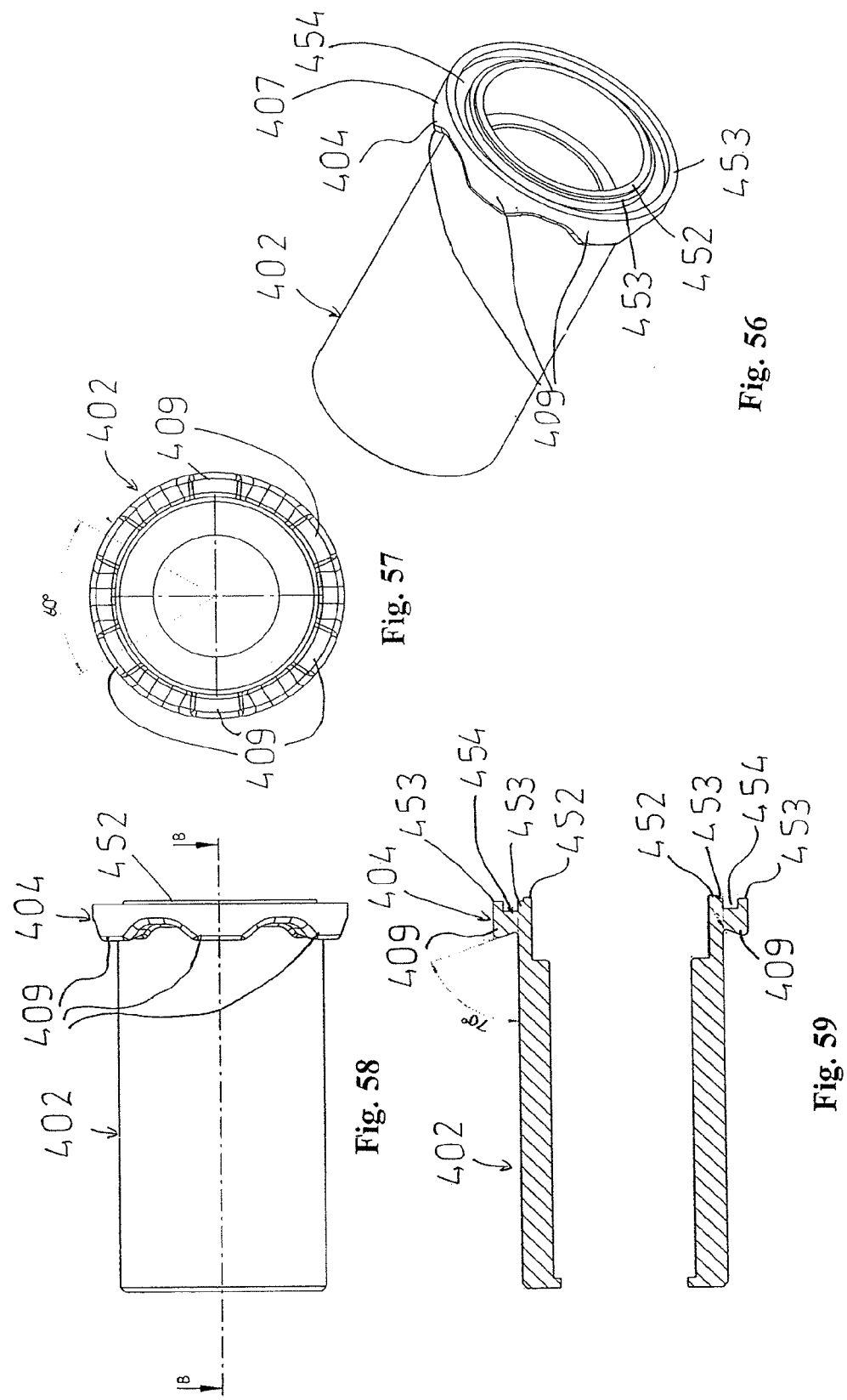

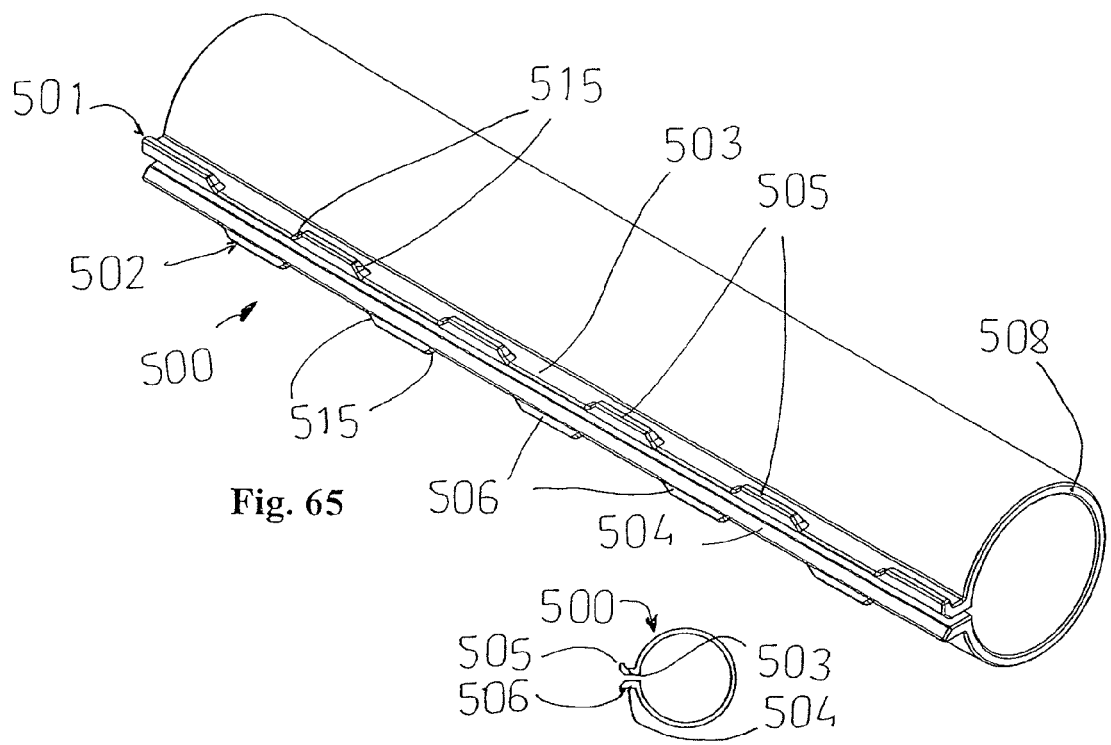
Fig. 65
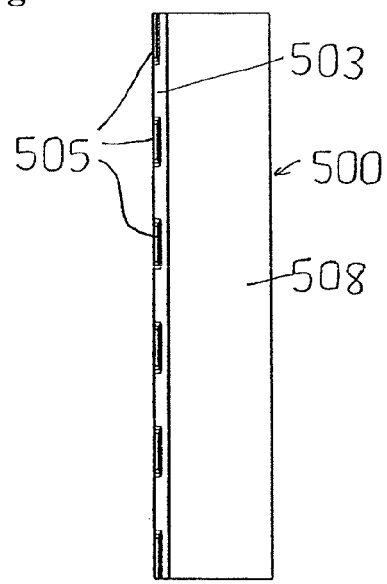
Fig. 67
Fig. 66

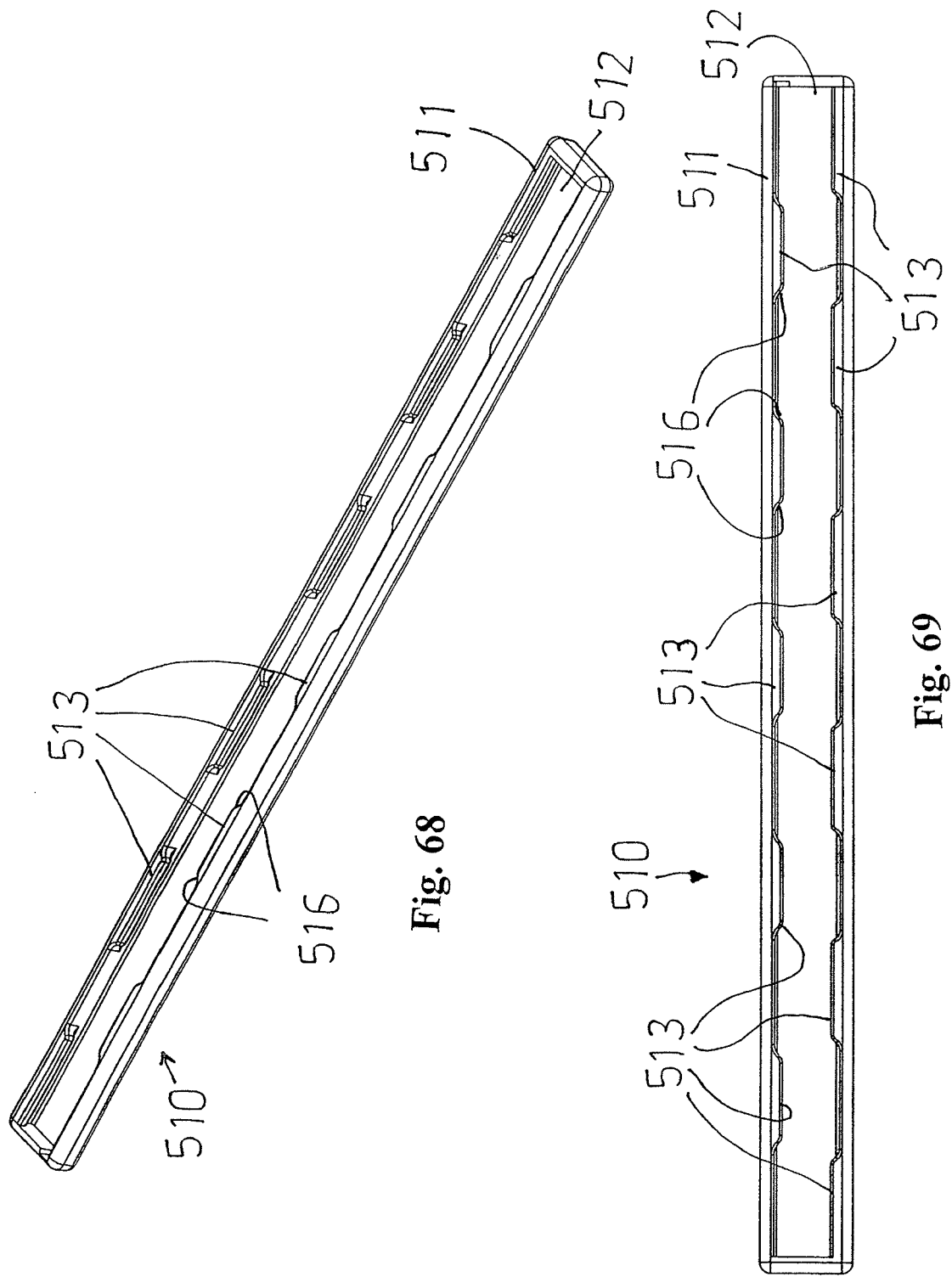

CONNECTING METHOD

This application is a continuation in part of international application number PCT/AU2011/001463 filed Nov. 11, 2011 which designates the United States of America and additionally claims priority from Australian provisional patent application number 2012901891 filed May 9, 2012, Australian provisional patent application number 2010905008 filed Nov. 11, 2010, Australian provisional patent application number 2011901274 filed Apr. 6, 2011, and Australian patent application number 2012227192 filed Sep. 19, 2012.

FIELD OF THE INVENTION

This invention concerns a method for mechanically connecting two or more components together. In one aspect, the invention concerns components having key arrangements and keys of the key arrangements are retainable by a key connector such that the key connector clamps the components together to form a secure joint.

BACKGROUND OF THE INVENTION

In the specifications of international patent application number PCT/AU2008/000839 and Australian patent application number 2009248444 the present inventors describe an earlier connecting method for mechanically connecting components together. That connecting mechanism comprises components having keyway arrangements and a keyway connector having keys retainable by the keyway arrangements so as to lock the components together to form a secure joint. The method comprises the steps of aligning the keyway arrangements of the first and second components such that the keyways provide a keyway passage extending longitudinally between the keyways, and extending the keyway connector longitudinally within the keyway passage such that the keyway connector engages the keyways of the keyway arrangements to lock the first and second components together.

The inventors have now developed a new connecting mechanism that, although utilising keys and a keyway, operates in a different manner from the connecting mechanism described earlier in that it does not have a keyway passage extending longitudinally between keyways as such.

The instant invention minimises or overcomes one or more of the component-joining problems referred to the specifications of international patent application number PCT/AU2008/000839 and Australian patent application number 2009248444, the entire contents of which are incorporated herein by way of cross-reference. For clarity, relevant passages of number 2009248444 are reproduced below.

Plastic is a versatile material that can be rotationally cast, injection moulded, heated and vacuum or pressure formed and even draped over form-work to make a variety of shapes for various purposes. For mass production, injection moulding is a preferred method because it is fast, energy efficient and gives more precision of shape and size. It is, however, limiting in that internal cavities can't be made without welding or gluing the components together. For some plastics, especially those in the polyolefin group like the very popular polypropylene, gluing is not normally successful, so welding or using mechanical compression fittings and seals is the only real joining alternative. Compression fittings are limited in how big they can be in practice because of expense. They are also predominantly used for standard sized pipe as making compression fittings for the variety of shapes required for consumer items is not practical. Even if it were practical for small items, moulded compression fittings are not practical nor cost effective for large plastic parts, so in these circumstances fabrication and welding is the only realistic alternative.

Several methods of welding are practiced. Butt welding involves cutting and cleaning both surfaces to be joined and then heating them before they are pushed together while still molten. This type of joint can leave an internal weld bead which is difficult to remove and can cause ragging that could lead to blockages when used for sewer pipelines. Fusion welding, where fittings have electrical resistance wire built into the components to melt the plastic, is also popular. Fusion joints can be pushed together whilst clean, then electrical energy is used to heat the bonding surfaces of the joint to fuse the parts together and so achieve a good seal. Other forms of welding include ultrasonic and hot air welding and both are time consuming and require specialist equipment and skills to bond joints successfully and safely. All forms of welding can produce toxic fumes and require good ventilation or breathing apparatus to be worn.

This significantly limits the uses to which plastics could otherwise be put, because it is time consuming and expensive to fabricate good quality joints on large components. Also, getting smooth curves when cold bending plastics for fabricated components is problematic and so is seldom done commercially.

Adhesives and glues are another alternative, but like welding processes, these are usually messy, hazardous, require specific surface preparation and conditions, and typically provide permanent, non-reversible joints only.

Drums and pails are commonly used for the storage of hazardous or messy liquids and powders. They must have positive seals that are robust, even when dropped. Commonly used bucket-type clips are prone to leakage, have a limited shelf life and once opened are no longer very effective. Threads provide a positive joining method but are expensive to mould, especially on large plastic components, and if they become too large they are very difficult to undo or tighten in real world conditions. Threads also are limited to use on circular joint face profiles with planar joint faces.

The present application also concerns improvements to an invention described in international patent application number PCT/AU2011/001463.

DISCLOSURE OF INVENTION

The present inventors have now developed a general connecting method. In particular, the present inventors have now developed a general connecting method for connecting two or more components together which may be made of like or unlike plastics material, composites material or metals material or of any other suitable type of material. In one or more embodiments the connecting mechanism minimises or overcomes one or more of the component-joining problems referred to above.

The present invention broadly concerns a method of connecting at least a first component and a second component together, wherein each said component comprises at least one key arrangement extending along the component, said method comprising the steps of:

aligning the key arrangements of the first and second components such that aligned keys of the key arrangements extend generally in line with a common axis or ensuring alignment of the key arrangements of the first and second components such that aligned keys of the key arrangements extend generally in line with a common axis; and extending a key connector comprising at least one longitudinal keyway passage over the aligned keys generally in line with the common axis so that the keys extend within the keyway passage, are retained by the key connector, and the first and second components are clamped together.

According to a first aspect of the present invention, there is provided a method of connecting at least a first component and a second component together, wherein each said component comprises at least one key arrangement extending along the component and keys of the key arrangement are spaced apart from one another, said method comprising the steps of:

aligning the key arrangements of the first and second components such that aligned keys of the key arrangements extend generally in line with a common axis or ensuring alignment of the key arrangements of the first and second components such that aligned keys of the key arrangements extend generally in line with a common axis; and extending a key connector comprising at least one longitudinal keyway passage over the aligned keys generally in line with the common axis so that the keys extend within the keyway passage, are retained by the key connector, and the first and second components are clamped together.

The present invention also relates to at least a first component, a second component and a key connector as defined above when used for the method according to the first aspect.

Each key arrangement and its key or keys may extend along each component in any suitable way. For instance, the key arrangement may extend along a face, surface, edge, perimeter and/or periphery of the component. The form of each key arrangement will depend on the nature of each component and how they are to be connected to one another.

Each key arrangement may be detachably connected to a remainder of the component, and this may be achieved in any suitable way. For instance, the key arrangement may comprise a body and key or keys extending from the body, and the body may be receivable within a groove, pocket or a fold of a panel of the component.

Alternatively or additionally, the body may be mateable with the remainder of the component by way of male and female formations. For example, male formations (locating lugs) of the body may press fit/friction fit with openings in the remainder of the component, or vice-versa. Such formations may also help correctly orientate the body and remainder of the component relative to each other.

Each component may be of any suitable size, shape and construction, and may be made of any suitable material or materials. The component may be planar, angular, bent, arcuate, convex, concave, annular, discoid, cylindrical, split-ring, half-ring, modular, rectangular or of any other simple or complex geometry.

It is to be understood that the first and second components (and any further component for that matter) may in fact be different regions or sections of the one component. That is, the one component may have a first face, surface, edge, perimeter and/or periphery etc. that requires connection to a second face, surface, edge, perimeter and/or periphery etc. Therefore, first, second and further components as used herein may equally relate to faces, surfaces, edges, perimeters and/or peripheries etc of the one and same component.

Each component and key arrangement may be planar, angular, bent, arcuate, convex, concave, annular, tubular (circular or non-circular), discoid, conical, tapered, cylindrical, split-ring, half-ring, modular, rectangular or of any other simple or complex geometry. Each component and key arrangement may consist of metal, an alloy, steel, polyurethane, plastics material, composites, wood and wood-based materials, ceramics or rubber or any combination of these.

The key arrangement and component/remainder of the component need not be made of the same material or materials.

Each key arrangement may comprise a single key or any suitable number of keys, and the keys may be of any suitable size, shape and construction, provided that they can extend within the keyway passage and be retained by the key connector so as to clamp the components together to form a secure joint. In a preferred embodiment, each key is in the form of a hook or node and the keyway passage/key connector is shaped so as to be retained by the hook or node.

The key arrangements of the first and second components are aligned such that the keys generally extend in line with a common axis and this may be achieved in any suitable way. The axis may be linear, arcuate, circular or other than linear, arcuate or circular. The keys and/or component edge may have the general appearance of a sine, square, triangle or sawtooth waveform, having both peaks and troughs.

The keys of the key arrangements may intermesh with one another or not. If first and second components are to be connected together, then each key of the first component may be located immediately adjacent a key of the second component or not.

More than two components may be connected together. For instance, if first, second and third components are to be connected together, then the key of one component may be flanked by a respective key of each other component, although this need not necessarily be the sequence of keys.

Each component may have more than one key arrangement extending along the component. This would allow a component to be directly connected to two or more other components at the same time, thus enabling an endless number of complex structures to be assembled.

The key connector may be of any suitable size, shape and construction, and may be made of any suitable material or materials. The key connector need not be made of the same material as the first and second components. The key connector may consist of metal, an alloy, steel, polyurethane, plastics material, composites, wood or wood-based materials, ceramics or rubber or any combination of these. The key connector may be of unitary construction or may comprise two or more detachably connected pieces. An end of a first key connector piece may interference fit with an end of an adjacent second key connector piece. Alternatively, one end of an annular key connector may interference fit with the other end of the same connector.

Preferably, the key connector has an elongate body and the longitudinal keyway passage extends the entire length of the body (from end to end of the body), although this need not be the case. The keyway passage could be discontinuous in one or more places between opposed ends of the body.

The key connector may have more than one keyway passage. If so, then preferably a keyway passage extends along each longitudinal side of the body.

The keys may be retained by the key connector in any suitable way. Preferably, the key connector has one or more key retainers—preferably hooks or nodes—for retaining the keys on opposed longitudinal sides of the key connector body. Preferably, the key retainers and keys hook together but this need not be the case.

Preferably, the keys individually engage and are retained by individual said key retainers of the key connector to clamp the first and second components together.

Preferably, when the key connector is moved, slid or rotated, the calculated geometry of the keys and the key connector provides the appropriate locking force to enable the first and second components to be clamped together.

In one embodiment, a single hook may extend along one or each opposing longitudinal side of the key connector body.

In another embodiment, a single key retainer may extend along one longitudinal side of the key connector body and the other side of the key connector body may have a plurality of key retainers (eg. hooks). The plurality of key retainers may extend within the same plane and the key retainers may be spaced apart from one another in accordance with the spacing of the keys. With the key retainers in this arrangement, the key retainers may be slid into locking engagement with the keys or slid out of locking engagement with the keys either by way of uni-directional movement (eg; forward-forward) or bi-directional (ie: forward-reverse).

In yet another embodiment, each side of the key connector body may have a plurality of key retainers (eg. hooks) extending within the same plane and the key retainers may be spaced apart from one another in accordance with the spacing of the keys. The position of the key retainers may alternate from one side of the body to the other along a length of the body, or the key retainers of one longitudinal side of the body may directly oppose key retainers of the other longitudinal side of the body. With the key retainers in this arrangement, the key retainers may be slid into locking engagement with the keys or slid out of locking engagement with the keys. If the key connector body has spaced apart key retainers, then the key connector may be removed from clamping engagement with the keys in a lateral direction between the keys when not in locking engagement with the keys. The keys and key connector may engage so that they may releasably unlock or they may engage so that they cannot be unlocked without destroying the joint. This may be achieved in any suitable way. They may also engage such that the key connector can be reversibly fixed or held to prevent it accidentally unlocking with stress cycling. A lofted profile may be used to achieve this or alternatively any number of other methods that will be obvious to those skilled in the art may be used, e.g. insertable keys, tabs or grub screws.

The key connector may comprise a handle, lobe, tool/finger opening or grip surface extending from or along the connector body. The connector may have any suitable type of handle. The handle may extend almost the length of the body but for some applications it may be located at or near one end only. The handle may have openings for fingers located between an upper surface of the handle and an upper surface of the body. The handle may be removable or engage with a variety of gripping surfaces that can be formed onto a suitable face of the connector body.

Alternatively or additionally, the key connector may comprise a structural component extending from or along the body. This structural component may be, for example, planar, angular, bent, arcuate, convex, concave, annular, discoid, cylindrical, rectangular or of any other simple or complex geometry. This structural component may connect with another component, including by way of another key arrangement and key connector.

In one embodiment, the key connector is arcuate.

In another embodiment, the key connector is annular like a ring. The ring may be split or split and hinged so that two halves of the ring can be flexed away from one another, or the ring can comprise two or more connectable or hinged arcuate pieces.

In yet another embodiment, the key connector may have a planar body and at least one appropriately shaped cut out or formation in the planar body that provides a keyway passage with key retainers engageable with the keys to retain the keys.

The method may comprise the step of connecting or holding the components together using a further connecting mechanism. Such a mechanism may include mating male and female regions, such as, for example, a key and keyway arrangement, a tongue in groove arrangement, a pin and hole arrangement and so forth being located between abutting surfaces, faces or edges of the components. The components may be held together with a hinge mechanism utilising a hinge pin, flexible member or membrane or similar.

In the case where the key arrangements have the general appearance of a sine, square, triangle or sawtooth waveform, having peaks that overhang an edge of both the first and second components, the peaks may locate within the troughs of the adjacent component and be backed by an edge of that adjacent component that extends between the peaks. For example, first and second tubular components may each have a key arrangement extending as a flange around an end of a tubular remainder of the component. Each key arrangement may have an annular body extending around but slightly aback from the end of the tubular remainder and waveform peaks may overhang that end. When the ends of the components are brought together for connection, the peaks of the first component may locate within the troughs of the second component and the tubular remainder of the second component may back the peaks of the first component.

The method may further comprise the step of introducing a sealing member between the components before connecting them together, so as to render the connection fluid-tight. Any suitable type of sealing member may be used (e.g. a gasket or O-ring). A sealing member may be extended along abutting surfaces, faces or edges of the components.

Alternatively, abutting surfaces, faces or edges of the components themselves may be shaped to provide a sealing function. For example, one or more of the components may have an integrally formed (eg. moulded) sealing member.

In a first embodiment, the first component is in the form of a container and the second component is in the form of a closure for the container. The key arrangements may extend along a circumference of the container and closure, and the key connector may be annular.

In a second embodiment, the first component is in the form of a cylindrical, conical or other shape wall section of a tank and the second component is in the form of discoid base connectable to the wall section of the tank. The key arrangements may extend along a circumference of the wall section and base, and the key connector may be annular. In this embodiment, a third component in the form of a cylindrical, conical or other shape wall section of the tank may be connectable to a free end of the other wall section, again by way of an annular key connector.

In a third embodiment, the first and second components are in the form of panels or beams that are connectable edge to edge or face to face such that they extend substantially in the same plane or at different angles relative to one another. The key arrangements may extend along an edge or face of each panel or beam, and the key connector may be longitudinal. In this embodiment, any suitable number of additional panels or beams may be connected to the first and second components so as to form, for example, floors, walls, ceilings, roofs, form-work, scaffolding, architectural beams and other types of building elements, frames, structures or buildings.

In a fourth embodiment, the first and second components are in the form of pipes/tubes or general tubular (including conical) members that are connectable edge to edge and/or end to end. Each key arrangement (comprising one or more keys—hooked or not-hooked) may extend along a circumference of the pipe or tubular or conical member or adjacent the pipe end or tubular or conical member end that is to be connected. The components may be of the same diameter or of differing diameter, and one or more of the components may be conical or tapered. The pipe or tubular member may have a circular or non-circular cross-section, including a rectangular, triangular, hexagonal or octagonal cross-section. One or more of the components may have a flanged end.

The key arrangement may comprise a body or series of body segments in the form of an arcuate, tubular, cylindrical or annular strip or ring, and the key retainers (eg. hooked or not hooked) may extend from the body along a length of the body. The key retainers/hooks may have the appearance of a sine, square, triangle or sawtooth waveform, having both peaks and troughs. The key retainers/hooks may extend from one or both longitudinal sides of the body.

The key arrangement may be permanently connected or detachably connected to the pipe or tubular member or a remainder of the pipe or tubular member, and this may be achieved in any suitable way. For instance, the key arrangement body may be of integral/unitary construction with the pipe or tubular member. For instance, the key arrangement body may be receivable within or retainable by a groove or fold of the pipe or tubular member. For instance, the key arrangement body may be connectable to or otherwise engageable with a flange of the pipe or tubular member. Alternatively, or additionally, the key arrangement may be welded, fused, melted, glued, bolted, swaged, nailed, screwed or otherwise adhered, affixed or fastened to the pipe or tubular member or remainder of the pipe or tubular member. A flanged or grooved end of a pipe or tubular member may itself provide a key arrangement.

The key connector may comprise an arcuate, annular, tubular or ring body or a split ring body or multi-piece body, and key retainers (hooked or not hooked) of the key connector may be spaced along opposing longitudinal sides of the key connector body. The key retainers/hooks may be slid between adjacent keys of the key arrangements and rotated into locking engagement with the keys. The key retainers/hooks may extend generally in line with a central axis of the arcuate, annular or ring body and/or the key retainers/hooks may extend generally or otherwise point radially relative to a central axis of the body. The key connector may be able to ride over the keys when the key connector is being positioned over the aligned keys.

Each key connector retainer, hook or node and each key can comprise, on one or both of its ends, a smooth rounded, arcuate, filleted, tapered, chamfered or angular lead-in edge or surface. This lead-in edge or surface on one or both ends can provide an important self-aligning function of the components during assembly and also provide a means to function without hindrance by dimensional tolerance issues and alignment differences either from manufacture, transport, handling, fitment or during assembly. The lead-in edge or surface also enables the key and key retainer to apply the required load for the specified joint by moving the keys relative to the key retainers only one pitch length. By doing so the lead-in applies the required load along the entire length of the joint relative to the ease and friction fit of the two or more components being joined. The amount of friction applied per section of the join can be adjusted to ensure assembly is simple and efficient and in many cases requires simple hand tools (or in many cases can be performed by hand only) to lock and/or unlock the joint. These aspects of the present invention provide distinct advantages over existing similar methods such as dove-tail, C-shape, wedge-shape or other similar mechanical or connector type joins and mechanisms.

The first and second components may each be in the form of a pipe or tube having a flanged end with the key arrangements extending around and over abutting flanged ends of said pipes or tubes. Such pipe or tube components may be cylindrical, conical, tapered, square, rectangular or any other shape with similar or dissimilar sizes including varying wall thicknesses, inside diameters and outside diameters and others. This embodiment enables numerous combinations of joins of various size, shape, configuration or materials. One simple example may be joining cylindrical to conical components or square profile to cylindrical components. Another example is joining a pipe or tube to a valve, pump, junction, tank or similar. Importantly, this is particularly beneficial for pipe, tube or conical components that have wear-resistant linings and components that require ongoing or regular service access, rotation or change-out of liner materials and components, insulation materials, strengthening or repair components and materials. Industry examples of such may include but are not limited to wear-resistant lined pipe, chute-work, cyclone and hydrocyclone equipment and related components, insulated pipe, ducting, pile and drill pipe and casings. Another example is for pipeline repair, insulation, flotation and weighting including pipeline field joint installation procedures. Similar examples are suitable for cable repair, cable joint protection and cable repair, insulation, flotation, weighting and additional protection components.

According to a second aspect of the present invention, there is provided an assembly comprising at least a first component, a second component and a key connector, wherein each said component comprises at least one key arrangement having one or more keys extending along the component, wherein the key arrangements of the first and second components are aligned such that aligned keys of the key arrangements extend generally in line with a common axis, and wherein the key connector comprises at least one longitudinal keyway passage and the key connector extends over the aligned keys generally in line with the common axis so that the keys extend within the keyway passage, are retained by the key connector, and the first and second components are clamped together.

The components and key connector of the assembly may be as described above for the first aspect of the invention. Again, it is to be understood that the first and second components (and any further component for that matter) may in fact be different regions or sections of the one component. That is, the one component may have a first face, surface, edge, perimeter and/or periphery etc. that requires connection to a second face, surface, edge, perimeter and/or periphery etc. Therefore, first, second and further components as used herein may equally relate to faces, surfaces, edges, perimeters and/or peripheries etc of the one and same component.

The specifications of international patent application number PCT/AU2008/000839 and Australian patent application number 2009248444 describe numerous types of components but having a different type of connecting mechanism. It is to be understood that the connecting mechanism described in those earlier applications (particularly in the preferred embodiment section) could in most instances be substituted for the connecting mechanism as described in the instant specification.

Particularly preferred embodiments of the invention are defined in the following paragraphs and can include one or more other features as described above or in the description of the preferred embodiments section:

1. A method of connecting at least a first component and a second component together, wherein each said component comprises at least one key arrangement extending along the component, said method comprising the steps of: aligning the key arrangements of the first and second components such that aligned keys of the key arrangements extend generally in line with a common axis or ensuring alignment of the key arrangements of the first and second components such that aligned keys of the key arrangements extend generally in line with a common axis; and extending a key connector comprising at least one longitudinal keyway passage over the aligned keys generally in line with the common axis so that the keys extend within the keyway passage, are retained by the key connector, and the first and second components are clamped together.

2. The method of paragraph 1, wherein the key arrangement of the first component comprises a single key and the key arrangement of the second component comprises a plurality of keys.

3. The method of paragraph 2, wherein the single key is not hook shaped (hooked).

4. The method of paragraph 3, wherein said key connector comprises key retainers, and wherein said keys engage and are retained by said key retainers to clamp the first and second components together.

5. The method of paragraph 4, wherein when engaged, the key retainers and the keys of the second component hook together.

6. The method of any one of paragraphs 1 to 5, wherein the key connector has an elongate body and the longitudinal keyway passage extends substantially the entire length of the body.

7. The method of paragraph 6, wherein the key connector comprises two keyway passages.

8. The method of paragraph 6 or paragraph 7, wherein the elongate body has longitudinal sides and each longitudinal side has a plurality of key retainers extending within the same plane and at least some of the key retainers are spaced apart from one another in accordance with the spacing of the keys.

9. The method of any one of the preceding paragraphs, wherein the first component is in the form of a container and the second component is in the form of a closure for the container.

10. The method of any one of paragraphs 1 to 8, wherein the first component is in the form of a cylindrical, conical or other shape wall section of a tank and the second component is in the form of discoid base, lid or cover connectable to the wall section of the tank.

11. The method of any one of paragraphs 1 to 8, wherein the first and second components are in the form of tubular members that are connectable edge to edge or end to end.

12. The method of any one of the preceding paragraphs when dependent from paragraph 4, wherein at least one said key retainer and at least one said key comprises on one or both of ends, a smooth rounded, arcuate, filleted, tapered, chamfered or angular lead-in edge or surface.

13. An assembly comprising at least a first component, a second component and a key connector, when assembled according to the method of any one of paragraphs 1 to 12.

Other particularly preferred embodiments of the invention are defined in the following paragraphs:

1. A method of connecting at least a first component and a second component together to form a joint, wherein each said component comprises at least one key arrangement extending along the component and keys of the key arrangement are spaced apart from one another, said method comprising the steps of: aligning the key arrangements of the first and second components in a predetermined fixed orientation to one another such that aligned keys of the key arrangements extend generally in line with a common axis or ensuring alignment of the key arrangements of the first and second components in a predetermined orientation to one another such that aligned keys of the key arrangements extend generally in line with a common axis; and extending and moving a key connector comprising at least one longitudinal keyway passage over the aligned keys in the predetermined orientation generally in line with the common axis so that the keys extend within the keyway passage, are retained by the key connector, and the first and second components in the predetermined orientation are clamped together to form a joint under sufficient load, wherein: the key connector has an elongate body having longitudinal sides, the longitudinal keyway passage extends along a length of the body, each longitudinal side has a plurality of hooked key retainers having key-engaging surfaces, the hooked key retainers of a first said side are identically spaced from the common axis when the first and second components are clamped together, and the hooked key retainers of a second said side are identically spaced from the common axis when the first and second components are clamped together, said keys individually engage and are hooked by individual said hooked key retainers such that the key-engaging surfaces extend in line with the common axis when the first and second components are clamped together and the joint is under sufficient load; and said keys and/or hooked key retainers have ends comprising lead-in edges or surfaces for assisting with individual engagement of said keys with said hooked key retainers for placing the joint under sufficient load.

2. The method of paragraph 1, wherein the keys and/or edges of said first and second components have the general appearance of a sine, square, triangle or sawtooth waveform, having both peaks and troughs.

3. The method of paragraph 1 or paragraph 2, wherein the keys of the key arrangements intermesh with one another.

4. The method of any one of paragraphs 1 to 3, wherein the longitudinal keyway passage extends the entire length of the body.

5. The method of paragraph 4, wherein the key connector comprises two keyway passages.

6. The method of any one of paragraphs 1 to 5, wherein the hooked key retainers alternate in position from one said longitudinal side of the body to the other along a length of the elongate body.

7. The method of any one of paragraphs 1 to 5, wherein the hooked key retainers of one said longitudinal side of the body directly oppose hooked key retainers of the other longitudinal side of the body.

8. The method of any one of the preceding paragraphs, wherein the key connector is removable from clamping engagement with the keys in a lateral direction between the keys when not in locking engagement with the keys.

9. The method of any one of the preceding paragraphs, wherein the first component is in the form of a container and the second component is in the form of a closure for the container.

10. The method of any one of paragraphs 1 to 8, wherein the first component is in the form of a cylindrical, conical or other shape wall section of a tank and the second component is in the form of discoid base, lid or cover connectable to the wall section of the tank.

11. The method of any one of paragraphs 1 to 8, wherein the first and second components are in the form of panels or beams that are connectable edge to edge or face to face such that they extend substantially in the same plane or at different angles relative to one another.

12. The method of any one of paragraphs 1 to 8, wherein the first and second components are in the form of tubular members that are connectable edge to edge or end to end.

13. The method of any one of the preceding paragraphs, wherein each said hooked key retainer and each said key comprises on one or both said ends a smooth rounded, arcuate, filleted, tapered, chamfered or angular said lead-in edge or surface.

14. An assembly comprising at least a first component, a second component and a key connector, wherein each said component comprises at least one key arrangement having keys extending along the component, wherein the key arrangements of the first and second components are aligned in a predetermined fixed orientation to one another such that aligned keys of the key arrangements extend generally in line with a common axis, and wherein the key connector comprises at least one longitudinal keyway passage and the key connector extends over the aligned keys in the predetermined orientation generally in line with the common axis so that the keys extend within the keyway passage, are retained by the key connector, and the first and second components in the predetermined orientation are clamped together to form a joint under sufficient load, wherein: the key connector has an elongate body having longitudinal sides, the longitudinal keyway passage extends along a length of the body, each longitudinal side has a plurality of hooked key retainers having key-engaging surfaces, the hooked key retainers of a first said side are identically spaced from the common axis when the first and second components are clamped together, and the hooked key retainers of a second said side are identically spaced from the common axis when the first and second components are clamped together, said keys individually engage and are hooked by individual said hooked key retainers such that the key-engaging surfaces extend in line with the common axis when the first and second components are clamped together and the joint is under sufficient load; and said keys and/or hooked key retainers have ends comprising lead-in edges or surfaces for assisting with individual engagement of said keys with said hooked key retainers for placing the joint under sufficient load.

15. The assembly of paragraph 14, wherein the keys and/or edges of said first and second components have the general appearance of a sine, square, triangle or sawtooth waveform, having both peaks and troughs.

16. The assembly of paragraph 14 or 15, wherein the keys of the key arrangements intermesh with one another.

17. The assembly of any one of paragraphs 14 to 16, wherein the key connector comprises two keyway passages.

18. The assembly of any one of paragraphs 14 to 16, wherein the hooked key retainers alternate in position from one said longitudinal side of the body to the other along a length of the elongate body.

19. The assembly of any one of paragraphs 14 to 16, wherein the hooked key retainers of one said longitudinal side of the body directly oppose hooked key retainers of the other longitudinal side of the body.

20. The assembly of any one of paragraphs 14 to 19, wherein the key connector is removable from clamping engagement with the keys in a lateral direction between the keys when not in locking engagement with the keys.

21. The assembly of any one of paragraphs 14 to 20, wherein the first component is in the form of a container and the second component is in the form of a closure for the container.

22. The assembly of any one of paragraphs 14 to 20, wherein the first component is in the form of a cylindrical, conical or other shape wall section of a tank and the second component is in the form of discoid base, lid or cover connectable to the wall section of the tank.

23. The assembly of any one of paragraphs 14 to 20, wherein the first and second components are in the form of panels or beams that are connectable edge to edge or face to face such that they extend substantially in the same plane or at different angles relative to one another.

24. The assembly of any one of paragraphs 14 to 20, wherein the first and second components are in the form of tubular members that are connectable edge to edge or end to end.

25. The assembly of any one of paragraphs 14 to 24, wherein each said hooked key retainer and each said key comprises on one or both said ends a smooth rounded, arcuate, filleted, tapered, chamfered or angular said lead-in edge or surface.

Preferred embodiments of the invention will now be described by way of example with reference to the accompanying figures.

BRIEF DESCRIPTION OF THE FIGURES

FIG. 1 is an exploded perspective view of a panel assembly comprising two panel components each having a key arrangement, plus a key connector for connecting the components together, according to an embodiment of the present invention;

FIG. 2 shows the panel assembly of FIG. 1 but with the two components in the process of being connected together using the key connector;

FIG. 3 is a bottom perspective view of the key connector shown in FIG. 1;

FIG. 4 follows on from FIG. 2, showing in end view the components and key connector fully assembled;

FIG. 5 is an exploded perspective view of a panel assembly comprising two panel components each having a key arrangement, plus a key connector for connecting the components together, according to an embodiment of the present invention;

FIG. 6 shows in perspective the components and key connector of FIG. 5 fully assembled;

FIG. 7 is a bottom perspective view of the key connector shown in FIG. 5;

FIG. 8 shows in end view the panel assembly of FIG. 6;

FIG. 11 is an exploded perspective view of a panel assembly comprising two panel components each having a key arrangement, plus a key connector for connecting the components together, according to an embodiment of the present invention;

FIG. 12 shows the panel assembly of FIG. 11 but with the two components in the process of being connected together using the key connector;

FIG. 13 is a bottom perspective view of the key connector shown in FIG. 11;

FIG. 14 is an exploded perspective view of a panel assembly comprising two panel components each having a key arrangement, plus a key connector for connecting the components together, according to an embodiment of the present invention;

FIG. 15 shows the panel assembly of FIG. 14 but with the two components in the process of being connected together using the key connector;

FIG. 16 is a bottom perspective view of the key connector shown in FIG. 14;

FIG. 17 is an exploded perspective view of a panel assembly comprising two panel components each having a key arrangement, plus a key connector for connecting the components together, according to an embodiment of the present invention;

FIG. 18 shows the panel assembly of FIG. 17 but with the two components in the process of being connected together using the key connector;

FIG. 19 is a bottom perspective view of the key connector shown in FIG. 17;

FIG. 20 is an exploded perspective view of a panel assembly comprising two panel components each having a key arrangement, plus a key connector for connecting the components together, according to an embodiment of the present invention;

FIG. 21 shows the panel assembly of FIG. 20 but with the two components connected together using the key connector;

FIG. 22 is a bottom perspective view of the key connector shown in FIG. 20;

FIG. 24 is an exploded perspective view of a panel assembly comprising two panel components each having a key arrangement, plus a key connector for connecting the components together, according to an embodiment of the present invention;

FIG. 25 shows the panel assembly of FIG. 24 but with the two components in the process of being connected together using the key connector;

FIG. 26 is a bottom perspective view of the key connector shown in FIG. 24;

FIG. 27 is an exploded perspective view of a panel assembly comprising two panel components each having a key arrangement, plus a key connector for connecting the components together, according to an embodiment of the present invention;

FIG. 28 shows the panel assembly of FIG. 27 but with the two components and key connector connected together;

FIG. 29 is a bottom perspective view of the key connector shown in FIG. 27;

FIG. 45 shows in perspective a split pipe component having two key arrangements, according to an embodiment of the present invention;

FIG. 46 is a side elevation view of the pipe component shown in FIG. 45;

FIG. 47 is an end view of the pipe component shown in FIG. 45;

FIG. 48 is a perspective view of a key connector for connecting together the two key arrangements shown in FIG. 45, according to another embodiment of the present invention;

FIG. 49 is a plan view of the key connector shown in FIG. 48;

FIG. 53 is the same as FIG. 52 except that the pipe/tube assembly has been assembled;

FIG. 54 is a side elevation view of the pipe/tube assembly shown in FIG. 53;

FIG. 55 is a cross sectional view of the pipe/tube assembly shown in FIG. 54, taken through plane A-A;

FIG. 56 shows in perspective a pipe/tube component of the assembly;

FIG. 57 is an end view of the component shown in FIG. 56;

FIG. 58 is a side elevation view of the component shown in FIG. 56;

FIG. 59 is a cross sectional view of the component shown in FIG. 58, taken through plane B-B;

FIG. 65 shows in perspective a split pipe component having two key arrangements, according to an embodiment of the present invention;

FIG. 66 is a side elevation view of the pipe component shown in FIG. 65;

FIG. 67 is an end view of the pipe component shown in FIG. 65;

FIG. 68 is a perspective view of a key connector for connecting together the two key arrangements shown in FIG. 65, according to another embodiment of the present invention;

FIG. 69 is a plan view of the key connector shown in FIG. 68;

DESCRIPTION OF THE PREFERRED EMBODIMENTS

Figure 9:
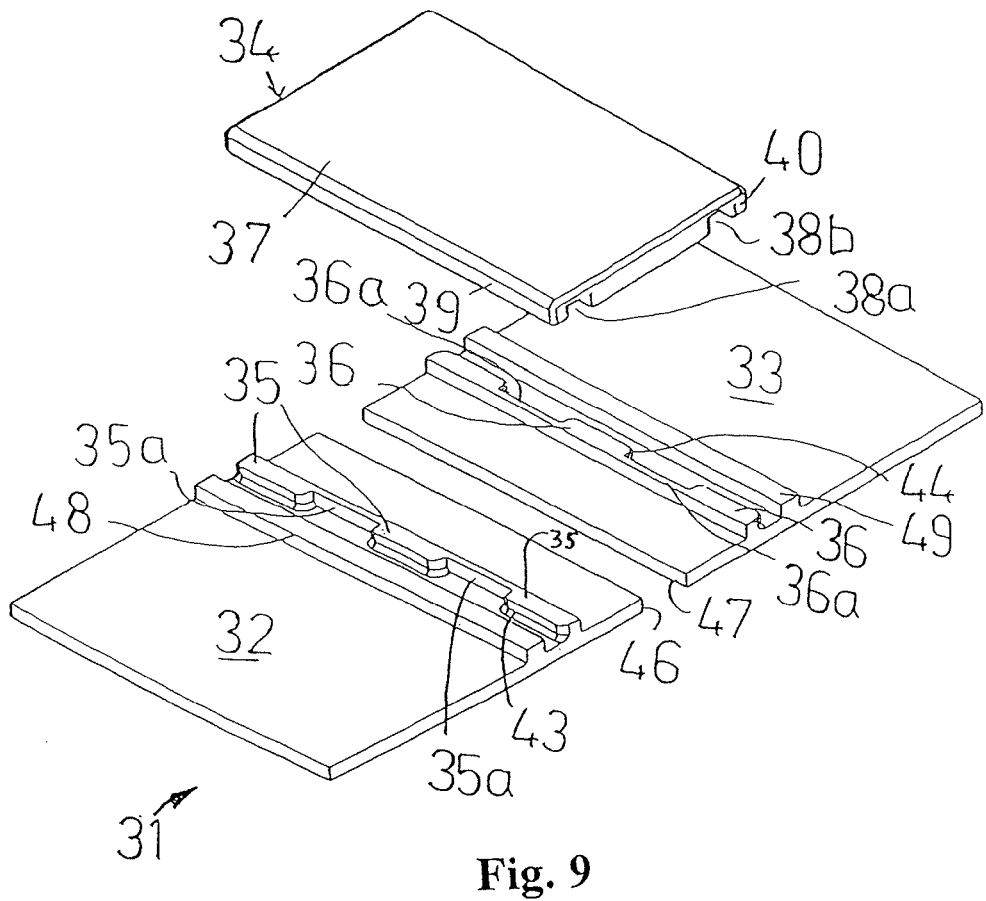
FIG. 9 is an exploded perspective view of a panel assembly comprising two panel components each having a key arrangement, plus a key connector for connecting the components together, according to an embodiment of the present invention.

In the figures, like reference numerals refer to like features.

Referring first to FIGS. 1-4, there is shown a panel assembly 1 comprising a first panel component 2, a second panel component 3 and a key connector 4. Preferably the assembly 1 is made of plastics material, although this need not be the case. A key arrangement extends along an edge 16 of the first panel 2 and comprises a plurality of regularly spaced keys 5. A key arrangement also extends along an edge 17 of the second panel 3 and comprises a plurality of regularly spaced keys 6.

The key connector 4 comprises a longitudinal body 7 and a longitudinal keyway passage 8 extending between longitudinal sides 9, 10 of the body 7. Each longitudinal side 9, 10 has a series of spaced key retainers/hooks 11, 12. The hooks 11, 12 extend in a common plane and are regularly spaced from one another. The spacing of hooks 11, 12 matches the spacing of keys 5, 6. Each key 5, 6 also is in the form of a hook 13, 14 that engages a hook 11, 12 of the key connector 4.

As seen in FIG. 2, the key arrangement of each panel 2, 3 can be aligned such that aligned keys 5, 6 of the key arrangements extend generally in line with a common axis 15 and an edge 16, 17 of each panel 2, 3 abuts. In order to clamp the panels 2, 3 together, the key connector body 7 is extended over the aligned keys 5, 6 generally in line with the common axis 15 so that the keys 5, 6 extend within the keyway passage 8 and are retained by the hooks 11, 12 of the key connector 4.

The key connector 4 body 7 can be inserted from above the keys 5, 6 through spaces between adjacent keys 5, 6 and slid longitudinally in line with the common axis 15 until hooks 11, 12 engage hooks 13, 14 of the keys 5, 6. To disconnect panel 2 from panel 3, the key connector body 7 is slid in line with the common axis 15 until the hooks 11, 12 no longer engage the hooks 13, 14 of the keys 5, 6.

Each key retainer/hook 11, 12 and each key 5, 6/hook 13, 14 has on both of its ends a smooth rounded, arcuate, filleted, tapered, chamfered or angular lead-in edge or surface. This lead-in edge or surface on both ends provides an important self-aligning function of the components 2, 3 during assembly and also provides a means to function without hindrance by dimensional tolerance issues and alignment differences either from manufacture, transport, handling, fitment or during assembly. The lead-in edge or surface also enables the keys 5, 6 and key retainers/hooks 11, 12 to apply the required load for the specified joint by moving the keys 5, 6 relative to the key retainers/hooks 11, 12 only one pitch length. By doing so the lead-in applies the required load along the entire length of the joint relative to the ease and friction fit of the two components 2, 3 being joined. The amount of friction applied per section of the join can be adjusted to ensure assembly is simple and efficient and in many cases requires simple hand tools (or in many cases can be performed by hand only) to lock and/or unlock the joint.

Referring now to FIGS. 5-8, there is shown a panel assembly 20 comprising a first panel component 2a that is almost identical to panel 2, a second panel component 3a that is almost identical to panel 3, and a key connector 4a that is identical to key connector 4.

The only difference between the assemblies 1 and 20 is that panels 2a and 3a each has a longitudinal upstand/rib 18, 19, creating longitudinal grooves within which the key connector's longitudinal sides 9, 10 locate—between upstand/rib 18 and key 5a, and between upstand/rib 19 and key 6a.

Figure 10:
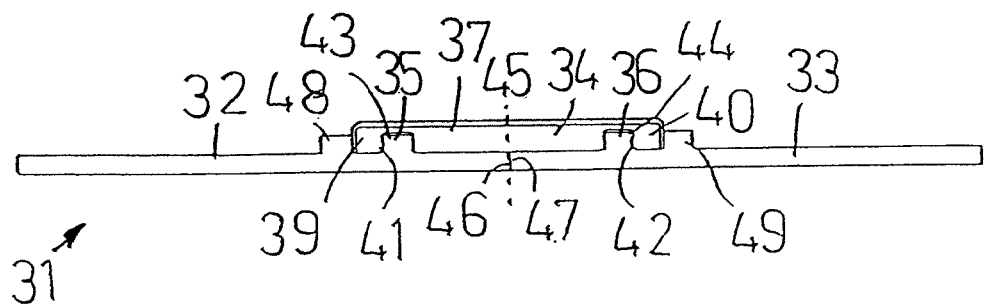
FIG. 10 shows in end elevation the components and key connector of FIG. 9 fully assembled.

Referring now to FIGS. 9 and 10, there is shown a panel assembly 31 comprising a first panel component 32, a second panel component 33 and a key connector 34. Preferably the assembly 31 is made of plastics material, although this need not be the case. A key arrangement extends parallel with but back from an edge 46 of the first panel 32 and comprises a plurality of regularly spaced keys 35 interconnected by an upstand/wall 35a. A key arrangement also extends parallel with but back from an edge 47 of the second panel 33 and comprises a plurality of regularly spaced keys 36 interconnected by an upstand/wall 36a.

The key connector 34 comprises a longitudinal body 37 and a pair of longitudinal keyway passages 38a, 38b extending between longitudinal sides 39, 40 of the body 37. Each longitudinal side 39, 40 has a series of spaced hooks 41, 42. The hooks 41, 42 extend in a common plane and are regularly spaced from one another. The spacing of hooks 41, 42 matches the spacing of keys 35, 36. Each key 35, 36 also is in the form of a hook 43, 44 that engages a hook 41, 42 of the key connector 34.

As seen in FIG. 10, the key arrangement of each panel 32, 33 can be aligned such that aligned keys 35, 36 of the key arrangements extend generally in line with a common axis 45 and an edge 46, 47 of each panel 32, 33 abuts. In order to clamp the panels 32, 33 together, the key connector body 37 is extended over the aligned keys 35, 36 generally in line with the common axis 45 so that the keys 35, 36 extend within the keyway passages 38a, 38b and are retained by the hooks 41, 42 of the key connector 34.

Panels 32 and 33 each has a longitudinal upstand/rib 48, 49, creating longitudinal grooves within which the key connector's longitudinal sides 39, 40 locate—between upstand/rib 48 and keys 35, and between upstand/rib 49 and keys 36.

The key connector 34 body 37 can be inserted from above the keys 35, 36 through spaces between adjacent keys 35, 36 and slid longitudinally in line with the common axis 45 until hooks 41, 42 engage hooks 43, 44 of the keys 35, 36. To disconnect panel 32 from panel 33, the key connector body 37 is slid in line with the common axis 45 until the hooks 41, 42 no longer engage the hooks 43, 44 of the keys 35, 36.

Referring now to FIGS. 11-13, there is shown a panel assembly 50 comprising a first panel component 2b that is almost identical to panel 2 (of FIG. 1), a second panel component 3b that is almost identical to panel 3, and a key connector 4b that is almost identical to key connector 4.

One difference between the assemblies 1 and 50 is that keys 5b and 6b are offset relative to one another as opposed to aligning with each other edge-to-edge when the panels 2b, 3b are clamped together with the key connector 4b. The other difference between the assemblies 1 and 50 is that key connector 4b keys 11b and 12b are offset relative to one another as opposed to aligning with each other. The key connector 4b is moved into and out of clamping position as described for assembly 1.

Referring now to FIGS. 14-16, there is shown a panel assembly 60 comprising a first panel component 2c that is almost identical to panel 2b (of FIG. 11), a second panel component 3c that is almost identical to panel 3b, and a key connector 4c that is identical to key connector 4b.

The only difference between the assemblies 50 and 60 is that an interconnecting wall 61 extends between keys 5c, and an interconnecting wall 62 extends between keys 6c.

Referring now to FIGS. 17-19, there is shown a panel assembly 70 comprising a first panel component 2d that is almost identical to panel 2b (of FIG. 11), a second panel component 3d that is almost identical to panel 3b, and a key connector 4d that is identical to key connector 4b.

The only difference between the assemblies 50 and 70 is that panels 2d and 3d each has a longitudinal upstand/rib 71, 72, creating longitudinal grooves within which the key connector's longitudinal sides 72, 74 locate—between upstand/rib 71 and keys 76, and between upstand/rib 72 and keys 77.

Referring now to FIGS. 20-22, there is shown a panel assembly 80 comprising a first panel component 2e that is very similar to panel 2d (of FIG. 11), a second panel component 3e that is very similar to panel 3d, and a key connector 4e that is identical to key connector 4d.

One difference between the assemblies 70 and 80 is that an interconnecting wall 81 extends between keys 76e, and an interconnecting wall 82 extends between keys 77e.

Another difference between the assemblies 70 and 80 is that an abutting edge 83, 84 of each panel 2e, 3e has a tongue in groove arrangement to further strengthen the joining of the panels 2e, 3e. That is, edge 83 has a longitudinal tongue 85 that is received within a longitudinal groove in edge 84, and edge 84 has a longitudinal tongue 86 that is received within a longitudinal groove in edge 83.

Yet another difference is that panels 2e and 3e each has a longitudinal upstand/rib 71e, 72e.

Figure 23:
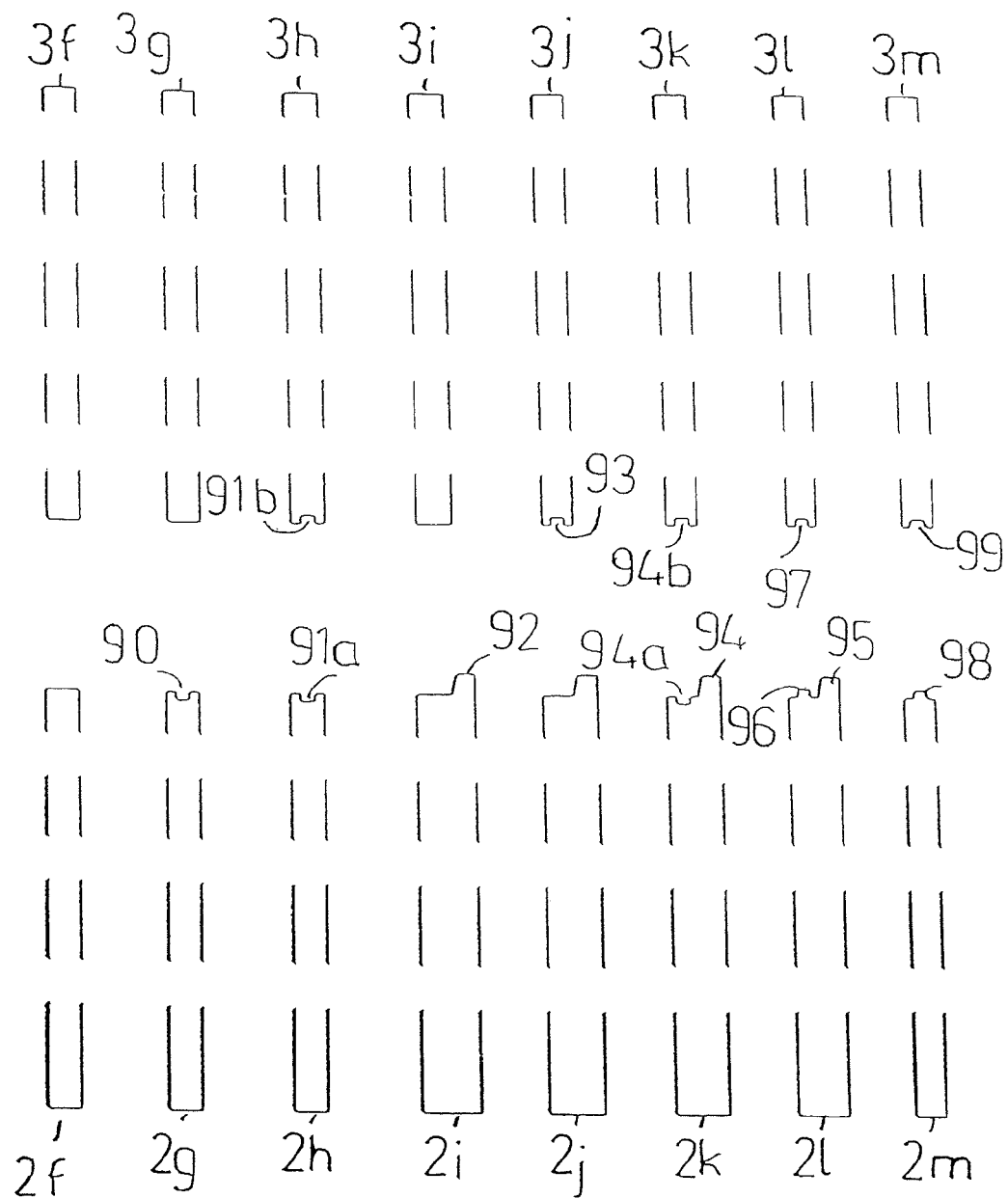
FIG. 23 depicts the joining/abutting edges/surfaces of various panel components (in end view) like those of FIG. 1, but omitting other details such as key arrangements (represented generally in broken lines), according to embodiments of the present invention.
Figure 31:
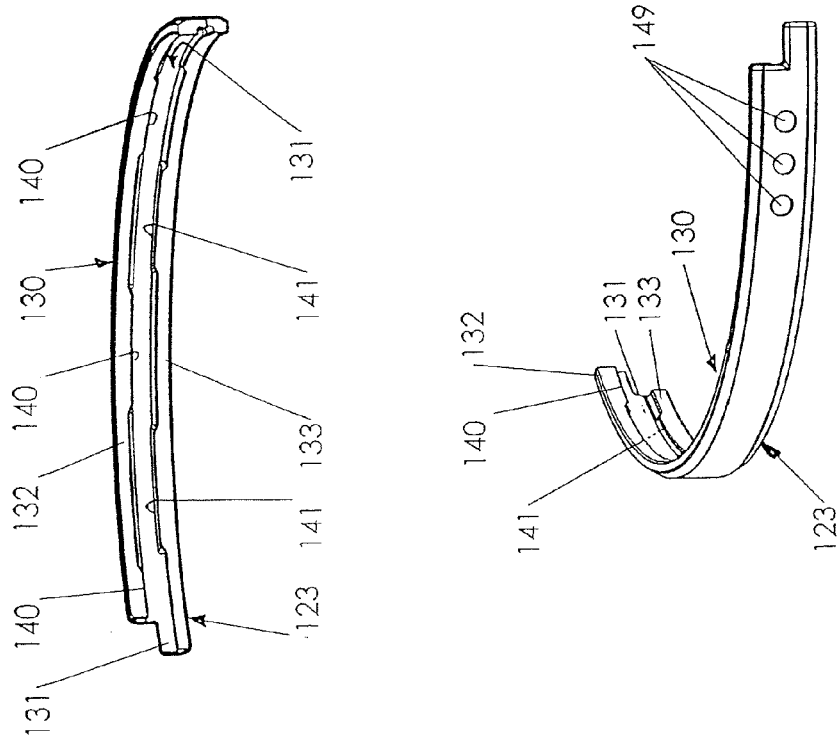
FIG. 31 is a perspective view of two parts of a key connector of the tank assembly shown in FIG. 30, according to an embodiment of the present invention.
Figure 30:
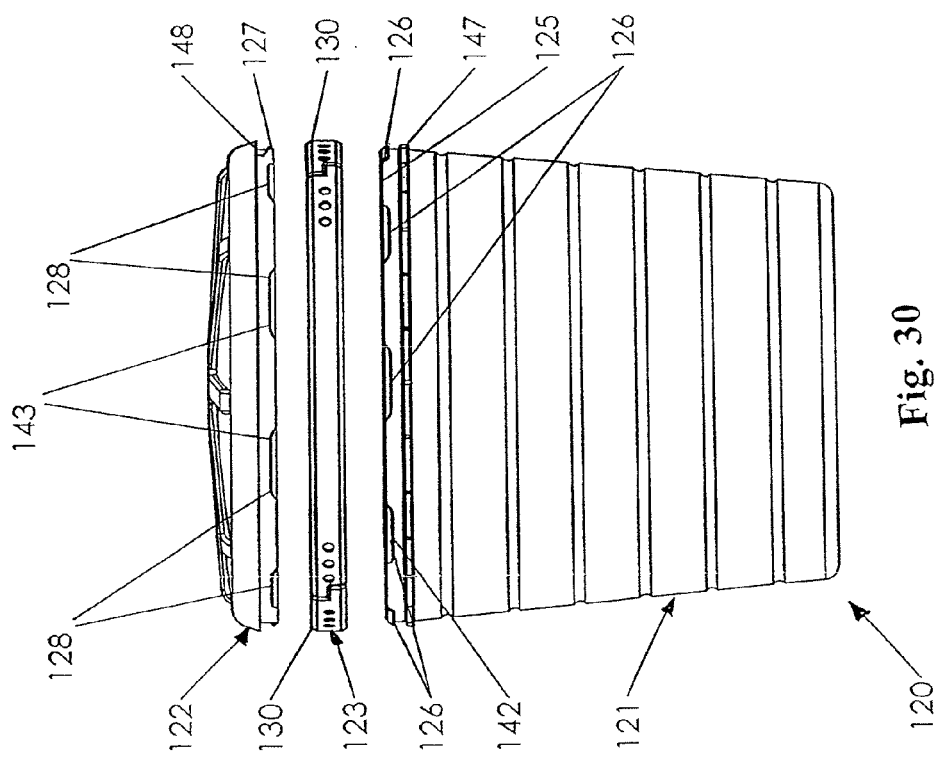
FIG. 30 is an exploded side view of a tank assembly comprising a container component, a lid component and a key connector, according to an embodiment of the present invention.

Referring now to FIG. 23 there is depicted joining/abutting edges of various panel components (in end view) like those of the earlier figures but omitting other details such as key arrangements. It is to be understood that these panel components 2f-2m and 3i-3m, as well as any of components 2 and 3 in general, can be of indefinite length, width and breadth.

Panel components 2f and 3f are only butt-joined together.

Panel components 2g and 3g are only butt-joined together but component 2g has a longitudinal groove 90 for receiving a seal or gasket.

Likewise, panel components 2h and 3h are butt-joined together but each component 2h, 3h has a longitudinal groove 91a, 91b for receiving a seal or gasket or for receiving a connecting strip for a tongue in groove arrangement.

Panel components 2i and 3i are butt-joined together and component 2i further has a backing section/strip 92 that overlaps and supports a lower edge of component 3i—thus providing a more secure joint.

Panel components 2j and 3j are the same as components 2i and 3i, except that component 3j has a longitudinal groove 93 for receiving a seal or gasket.

Panel components 2k and 3k are butt-joined together and component 2k further has a backing section/strip 94 that overlaps and supports a lower edge of component 3k. Moreover, panel components 2k and 3k each has a longitudinal groove 94a, 94b for receiving a seal/gasket or a longitudinal tongue (ie. tongue in groove arrangement)—thus providing a more secure joint.

Panel components 21 and 31 are joined together by way of a tongue 96 in groove 97 arrangement, and component 21 further has a backing section/strip 95 that overlaps and supports a lower edge of component 31.

Panel components 2m and 3m are joined together by way of a tongue 98 in groove 99 arrangement—thus providing a more secure joint than the butt join of components 2f and 3f.

FIGS. 24-26 show a panel assembly 100 comprising a first panel component 2n that is similar to panel 2b (of FIG. 11), a second panel component 3b that is similar to panel 3b, and a key connector 4n that is identical to key connector 4b.

A main difference between the assemblies 100 and 50 is that keys 5n and 6n and abutting edges 101, 102 are generally in a sine waveform, having both peaks and troughs. Since the keys 5n of panel 2n are offset from the keys 6n of panel 3n, the panels 2n, 3n can be clamped together as seen in FIG. 25 with the key connector 4n as shown in FIG. 26.

Key connector 4n is inserted from above the keys 5n, 6n through spaces between adjacent keys 5n, 6n and slid longitudinally in line with a common axis 103 until hooks 11n, 12n engage hooks 13n, 14n of the keys 5n, 6n. To disconnect panel 2n from panel 3n, the key connector 4n is slid in line with the common axis 103 until the hooks 11n, 12n no longer engage the hooks 13n, 14n of the keys 5n, 6n.

Referring now to FIGS. 27-29, there is shown a panel assembly 110 comprising a first panel component 2p that is almost identical to panel 2n (of FIG. 24), a second panel component 3p that is almost identical to panel 3n, and a key connector 4n that is identical to key connector 4n.

The only difference between the assemblies 110 and 100 is that panels 2p and 3p each has a longitudinal upstand/rib 111, 112, creating longitudinal grooves within which the key connector's longitudinal sides 113, 114 locate—between upstand/rib 111 and keys 5p, and between upstand/rib 112 and keys 6p.

Referring now to FIGS. 30-34, there is shown a tank assembly 120 comprising a container component 121, a lid component 122 and a multi-part key connector 123.

The assembly 120 is made of plastics material, although this need not be the case. A key arrangement extends along an upper edge 125 of the container component 121 and comprises a plurality of regularly spaced keys 126. A key arrangement also extends along a lower edge 127 of the lid component 122 and comprises a plurality of regularly spaced keys 128.

The container component 121 has a circumferentially extending proud rib 147. The lower edge 127 of the lid component 122 is recessed relative to a circumferentially extending shoulder 148.

The key connector 123 comprises multiple parts, each having a longitudinal arcuate body 130 and a longitudinal arcuate keyway passage 131 (see FIG. 31) extending between longitudinal sides 132, 133 of the body 130. Each longitudinal side 132, 133 has a series of spaced hooks 140, 141. The hooks 140, 141 extend in a common plane and are regularly spaced from one another but in an offset arrangement (like in assembly 50). The spacing of hooks 140, 141 matches the spacing of keys 126, 128. Each key 126, 128 also is in the form of a hook 142, 143 that engages a hook 140, 141 of the key connector 123.

Each keyway connector 123 part has a series of openings 149 in the body for receiving an end of a tool or a person's finger.

Figure 32:
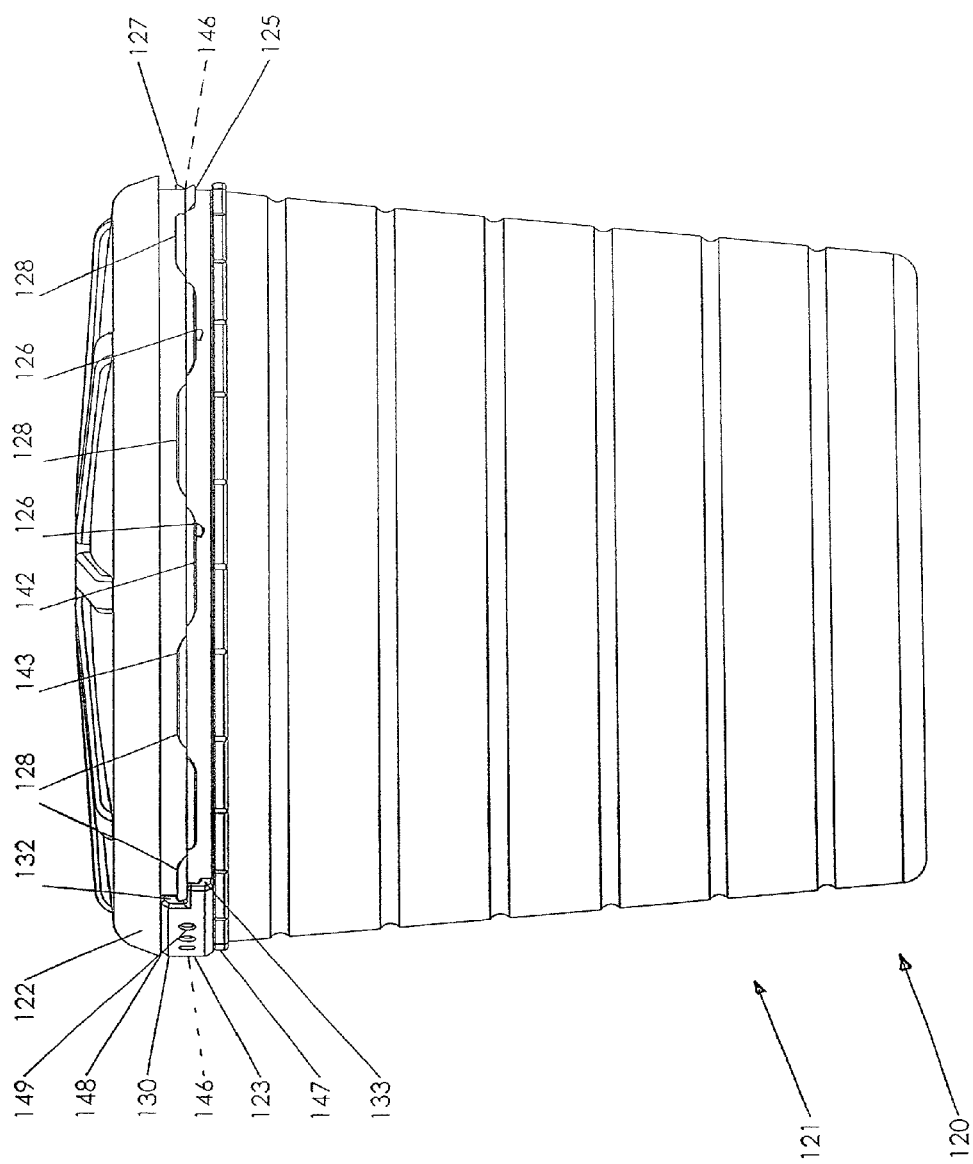
FIG. 32 is the same as FIG. 30 except that the tank assembly has been partially assembled.
Figure 34:
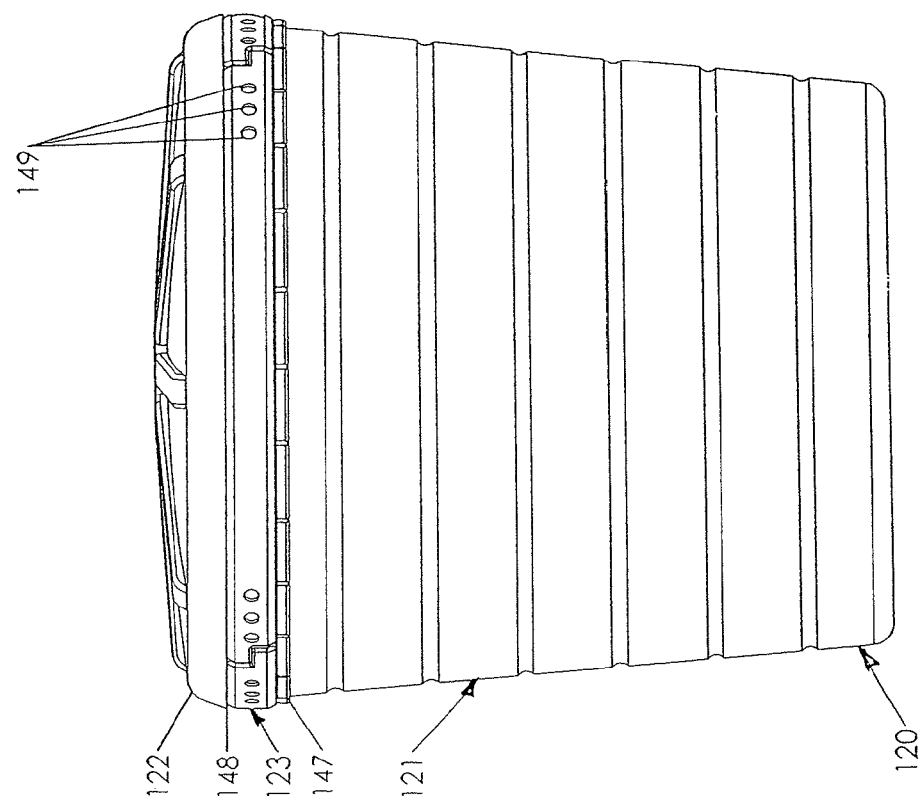
FIG. 34 is a side view of the tank assembly shown in FIG. 30 but fully assembled.

As seen in FIG. 32, the key arrangement of each component 121, 122 can be aligned such that aligned keys 126, 128 of the key arrangements extend generally in line with a common axis 146 and an edge 125, 127 of each component 121, 122 abuts. In order to clamp the components 121, 122 together, the key connector body 130 is extended over the aligned keys 126, 128 generally in line with the common axis 146 so that the keys 126, 128 extend within the keyway passage 131 and are retained by the hooks 140, 141 of the key connector 123.

Figure 33:
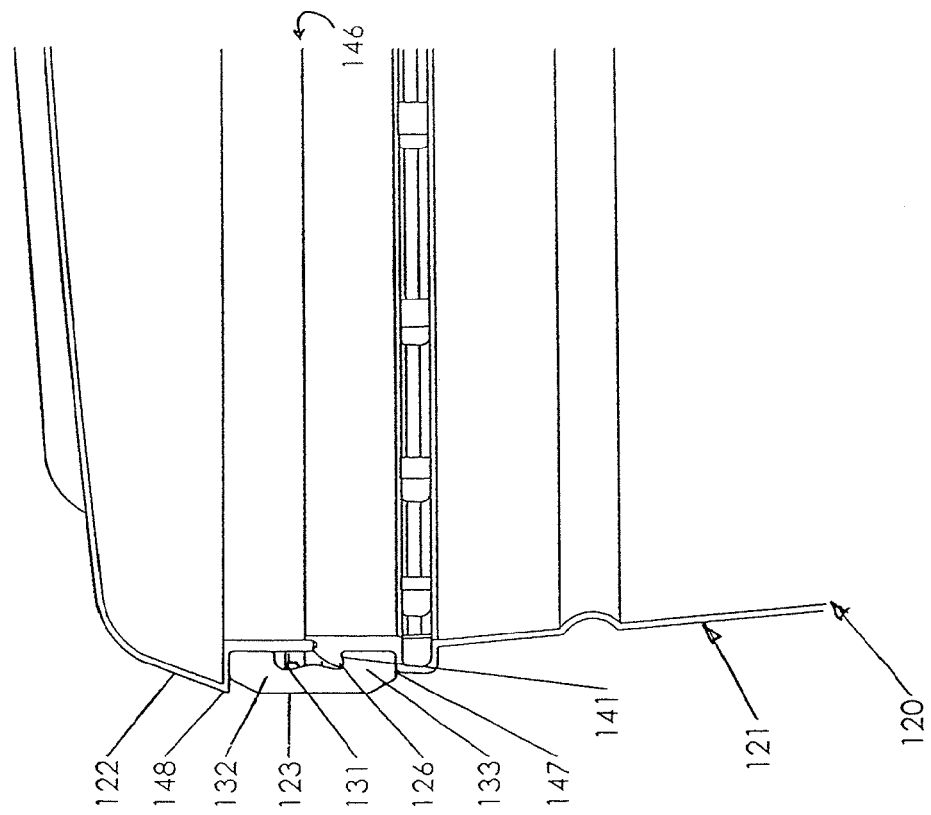
FIG. 33 is a side view of part of the tank assembly shown in FIG. 32.

The key connector 123 body 130 can be inserted from above the keys 126, 128 through spaces between adjacent keys 126, 128 and slid longitudinally in line with the common axis 146 until hooks 140, 141 engage hooks 142, 143 of the keys 126, 128. The key connector 123 body 130 is slid between the circumferentially extending proud rib 147 and the circumferentially extending shoulder 148, as seen in FIG. 33. To disconnect component 121 from component 122, the key connector body 130 is slid in line with the common axis 146 until hooks 140, 141 no longer engage hooks 142, 143.

Figure 35:
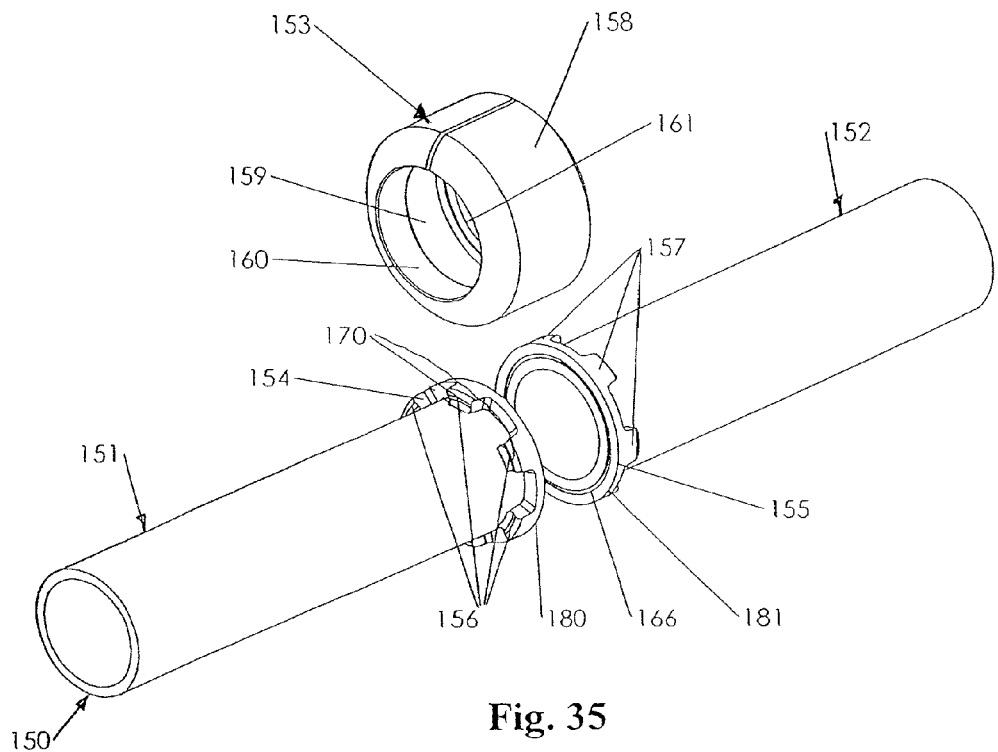
FIG. 35 is an exploded perspective view of a pipe/tube assembly comprising two pipe/tube components each having a key arrangement, plus a key connector for connecting the components together, according to an embodiment of the present invention.
Figure 36:
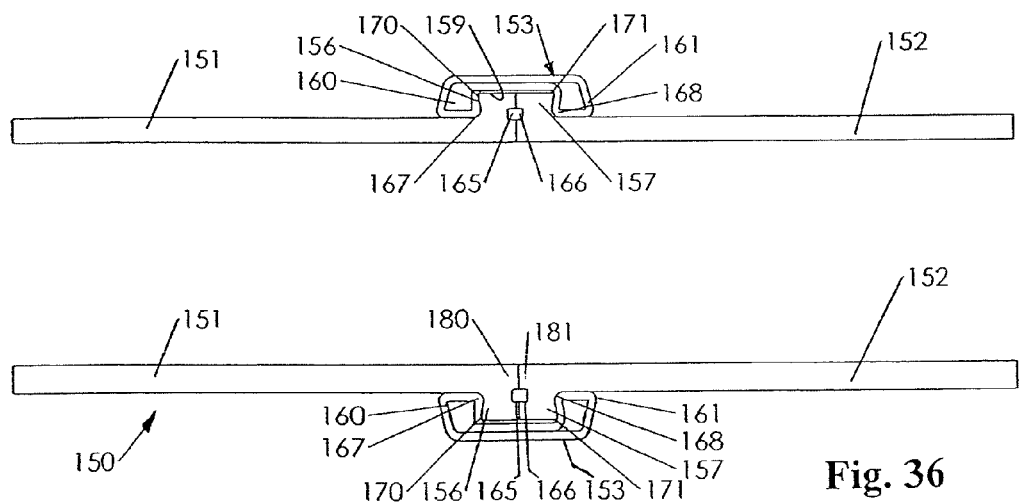
FIG. 36 is a longitudinal cross sectional view showing the assembly of FIG. 35 fully assembled.

Referring now to FIGS. 35 and 36, there is shown a pipe (tube) assembly 150 comprising two pipe components 151, 152 each having a key arrangement, plus a key connector 153 for connecting the pipe components 151, 152 together. These are made, for example, of metal, an alloy, steel, polyurethane, plastics material, composites (such as but not limited to glass, aramid or carbon fibre reinforced materials), ceramics or rubber or any combination of these either as separate components for assembly or as one component by way of welding, machining, casting, molding, co-molding or similar methods.

Each key arrangement has a body 154, 155 in the form of a collar 154, 155 and regularly spaced keys 156, 157 extend from a circumference of the collar 154, 155 and generally parallel with a central axis of the collar 154, 155. The keys 156, 157 are located at an end of each pipe 151, 152. An annular groove 165, 166 extends within an edge 180, 181 of each pipe 151, 152 and can receive a seal/gasket.

Each body 154, 155 can be glued or otherwise adhered to the pipe 151, 152 or each body 154, 155 can be of integral construction with each pipe 151, 152.

The key connector 153 comprises a longitudinal annular body 158 in the shape of a split ring, half-segments or multiple segments and a longitudinal keyway passage 159 extending between longitudinal sides 160, 161 of the body 158. Each longitudinal side 160, 161 has a series of spaced hooks 167, 168. The hooks 167, 168 extend in a common plane and are regularly spaced from one another. The spacing of hooks 167, 168 matches the spacing of keys 156, 157. Each key 156, 157 also is in the form of a hook 170, 171 that engages a hook 167, 168 of the key connector 153.

As seen in FIG. 36 the key arrangement of each pipe 151, 152 can be aligned such that aligned keys 156, 157 of the key arrangements extend generally in line with a common axis and the edge 180, 181 of each pipe 151, 152 abuts. In order to clamp the pipes 151, 152 together, the key connector body 158 is extended over a pipe 151 or 152 and aligned keys 156, 157 generally in line with the common axis so that the keys 156, 157 extend within the keyway passage 159 and are retained by the hooks 167, 168 of the key connector 153.

The split enables the annular body 158 to be flexed laterally such that the hooks 167, 168 of the key connector 153 can be hooked around the hooks 170, 171 of the keys 156, 157.

Once the keys 156, 157 extend within the keyway passage 159, it can be slid/rotated relative to the keys 156, 157 until the keys 156, 157 engage the hooks 167, 168 of the key connector 153 and are retained by those hooks 167, 168 so as to lock the pipes 151, 152 together.

Figures 37, 38:
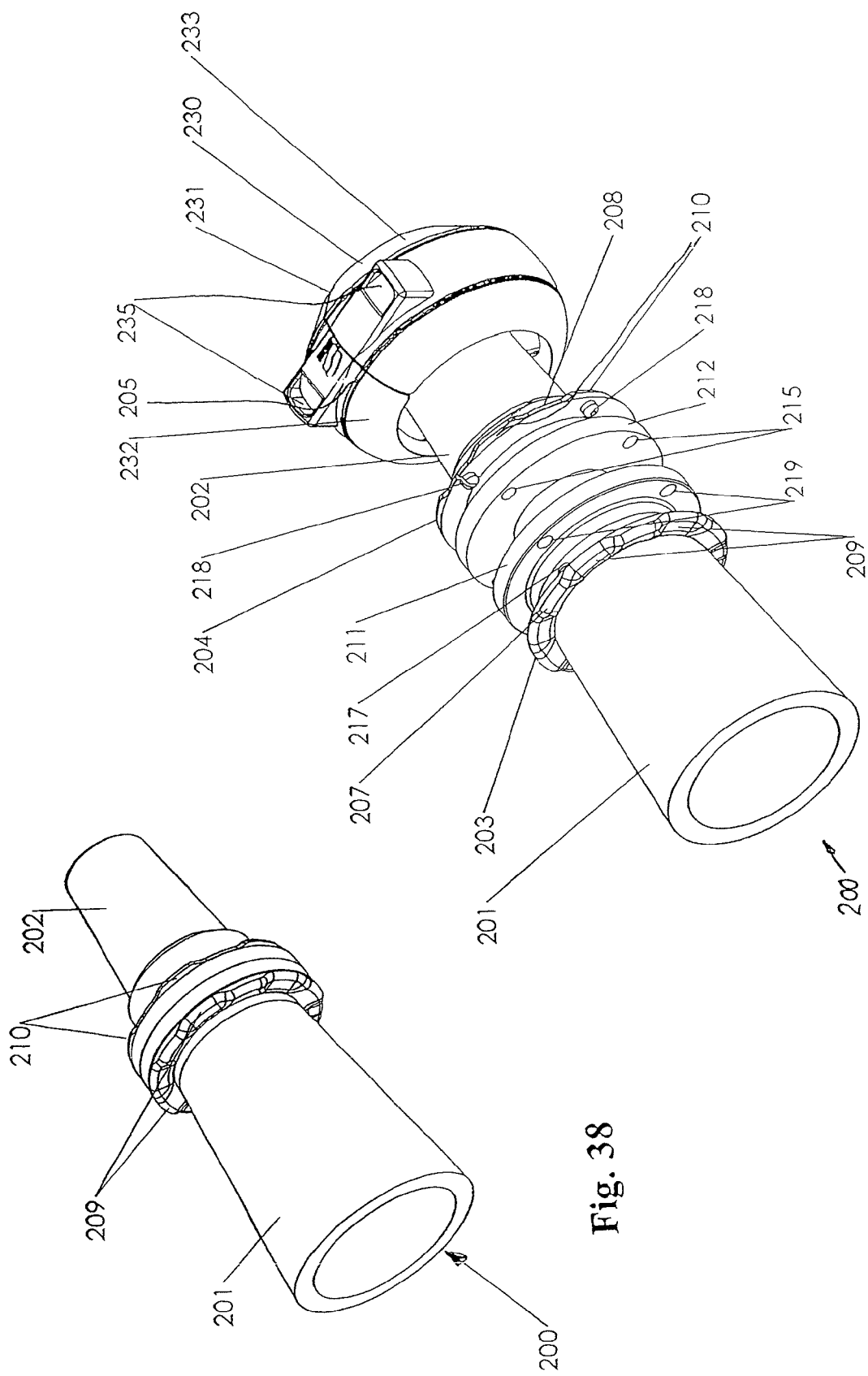
FIG. 37 is an exploded perspective view of a pipe/tube assembly comprising two pipe/tube components each having a key arrangement, plus a key connector for connecting the components together, according to an embodiment of the present invention.
FIG. 38 is the same as FIG. 37 except that the pipe/tube assembly has been partially assembled.

Referring now to FIGS. 37 and 38, there is shown a pipe (tube) assembly 200 comprising two flanged pipe components 201, 202 each having a key arrangement 203, 204, plus a key connector 205 for connecting the pipe components 201, 202 together. These are made, for example, of metal, an alloy, steel, polyurethane, plastics material, composites (such as but not limited to glass, aramid or carbon fibre reinforced materials), ceramics or rubber or any combination of these either as separate components for assembly or as one component by way of welding, machining, casting, molding, co-molding or similar methods.

The flanges 211, 212 of the pipes 201, 202 may have locating spigots and/or lugs (not shown) and openings 215 for receiving those lugs, for both orientating the pipes 201, 202 relative to one another and more positively connecting the flanges 211, 212 together.

Each key arrangement 203, 204 has an annular body 207, 208 in the form of a split ring 207, 208 and regularly spaced keys 209, 210 extend from a circumference of the ring 207, 208. Each key arrangement, 203, 204 may be attachable to its respective flange 211, 212 by way of locking lugs 217, 218 that extend from the ring 207, 208 and locate within openings in each flange 219.

The key connector 205 comprises a longitudinal annular body 230 in the shape of a split (231) ring 230, half-segments or multiple segments, and a longitudinal keyway passage (not shown) extending between longitudinal sides 232, 233 of the body 230. A pair of handles/lugs/finger grips/tool slots 235 extends from the body 230. Each longitudinal side 232, 233 has a series of spaced hooks (not shown). The hooks extend in a common plane and are regularly spaced from one another. The spacing of hooks matches the spacing of keys 209, 210. Each key 209, 210 also is in the form of a hook that engages a hook of the key connector 205.

As seen in FIG. 38 the key arrangement 203, 204 of each pipe 201, 202 can be aligned such that aligned keys 209, 210 of the key arrangements 203, 204 extend generally in line with a common axis and the flanged 211, 212 end of each pipe 201, 202 abuts. In order to clamp the pipes 201, 202 together, the key connector 205 body 230 is extended over a pipe 202 and aligned keys 209, 210 generally in line with the common axis so that the keys 209, 210 extend within the keyway passage and are retained by the hooks of the key connector 205.

The split 231 enables the annular body 230 to be flexed laterally such that the hooks of the key connector 205 can be hooked around the hooks of the keys 209, 210. The annular body 230 may be comprised of half-segments or multiple segments allowing assembly of the annular body to be achieved without lateral flex.

Once the keys 209, 210 extend within the keyway passage, it can be slid/rotated relative to the keys 209, 210 until the keys 209, 210 engage the hooks of the key connector 205 and are retained by those hooks so as to lock the pipes 201, 202 together.

Figure 39:
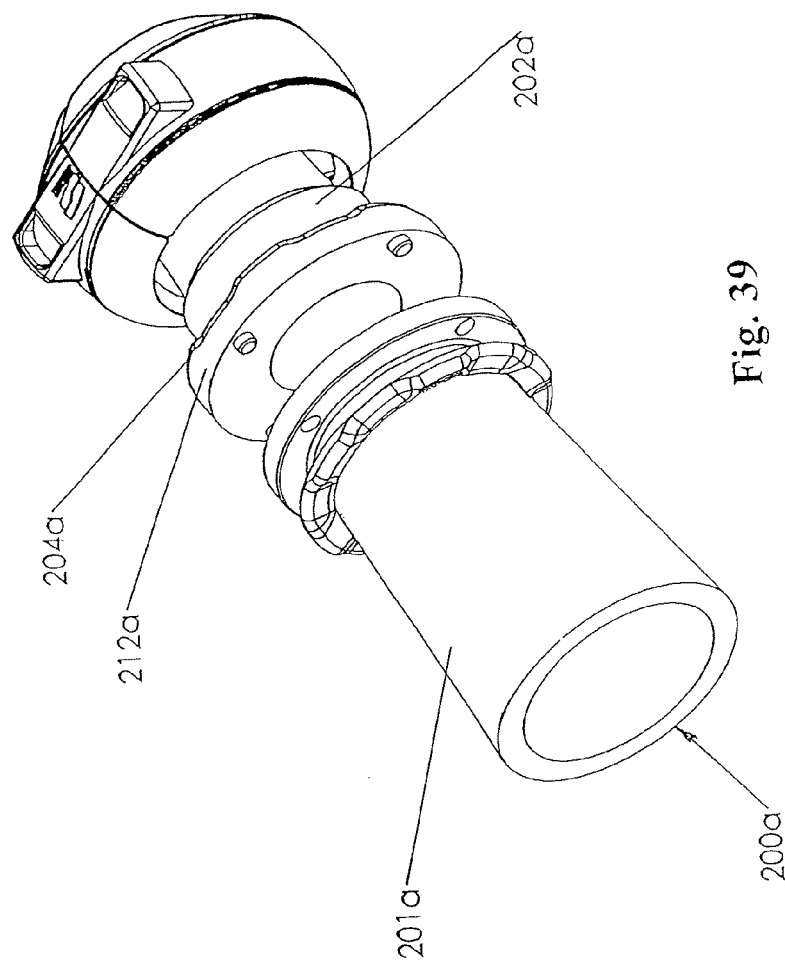
FIG. 39 is an exploded perspective view of a pipe/tube assembly comprising two pipe/tube components each having a key arrangement, plus a key connector for connecting the components together, according to an embodiment of the present invention.
Figure 40:
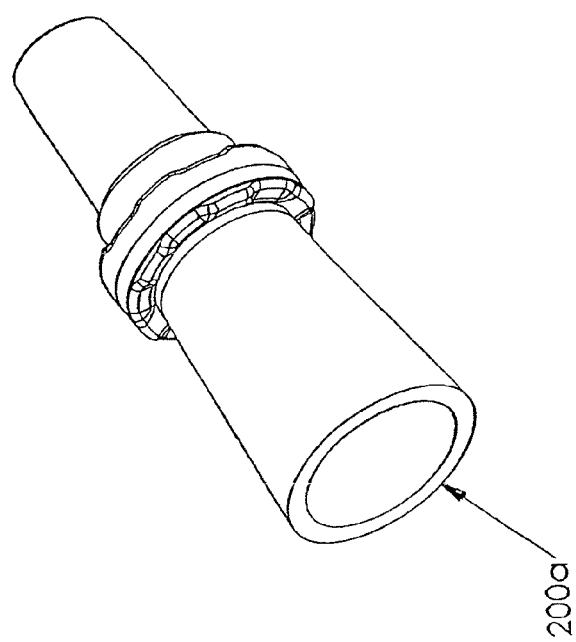
FIG. 40 is the same as FIG. 39 except that the pipe/tube assembly has been partially assembled.

Referring now to FIGS. 39 and 40, there is shown a pipe (tube) assembly 200a like assembly 200 shown in FIGS. 37 and 38. Assembly 200*a* is different from assembly 200 only in that key arrangement 204*a* of pipe 202*a* is of integral construction with flange 212*a*.

Figure 41:
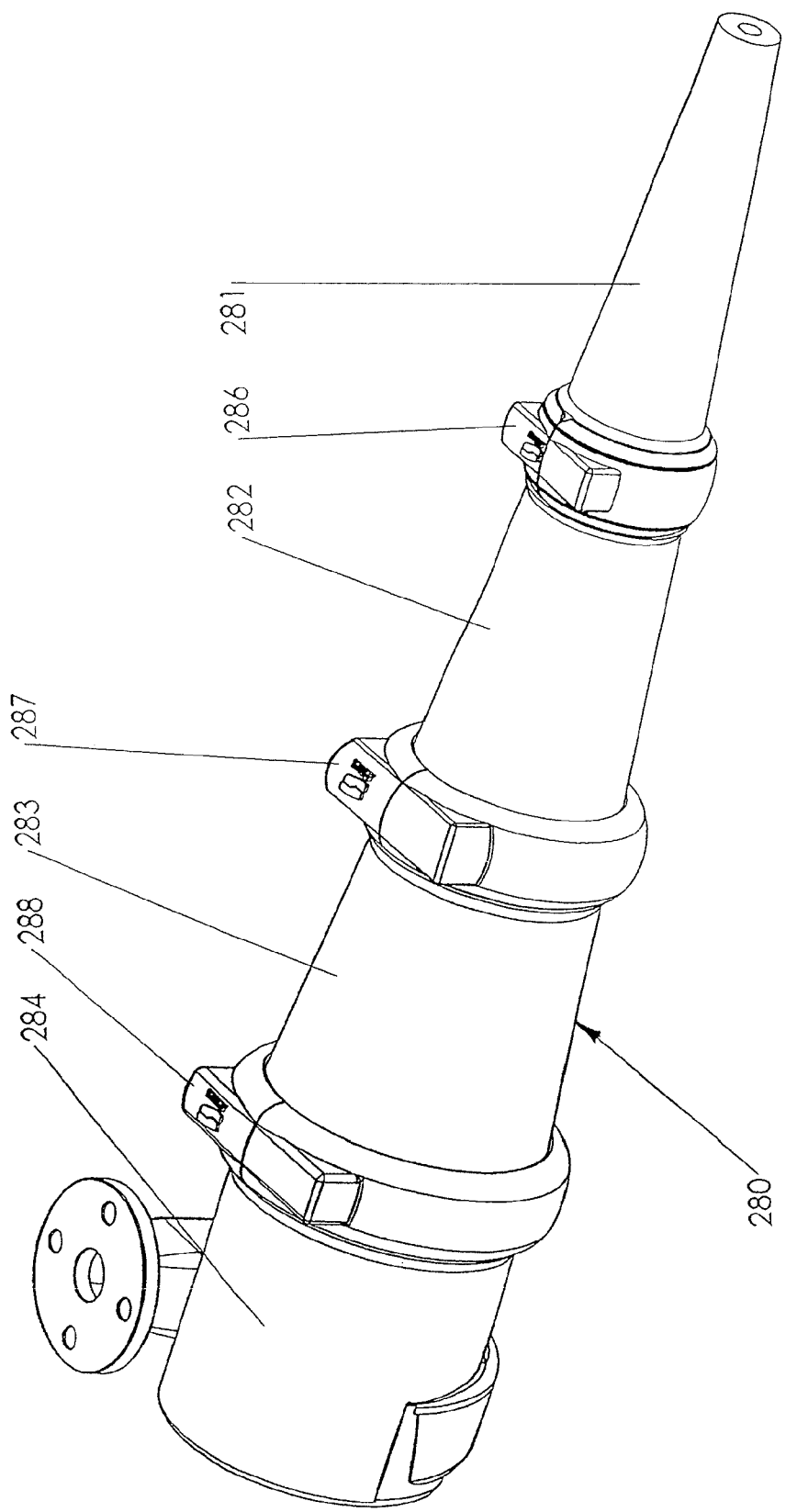
FIG. 41 shows in perspective a pipe/tube assembly fully assembled, according to an embodiment of the present invention.
Figure 42:
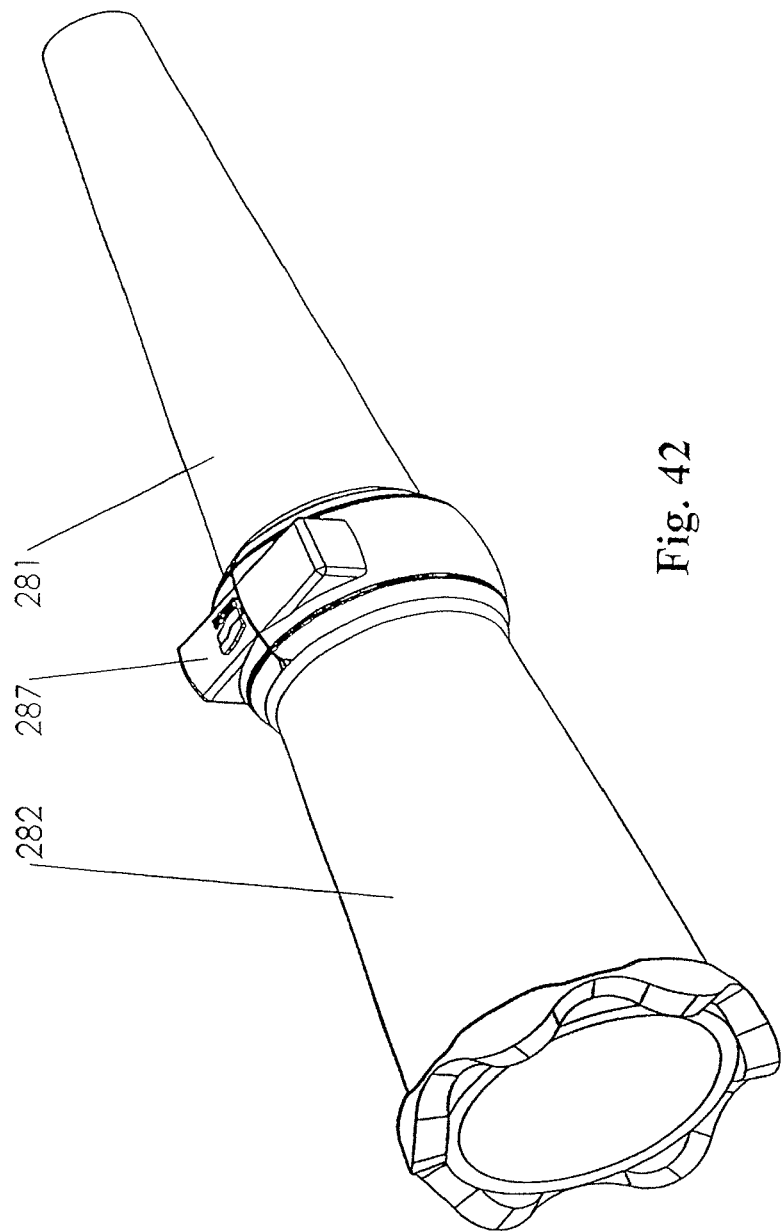
FIG. 42 shows in perspective two pipe/tube components of the assembly shown in FIG. 41.
Figure 43:
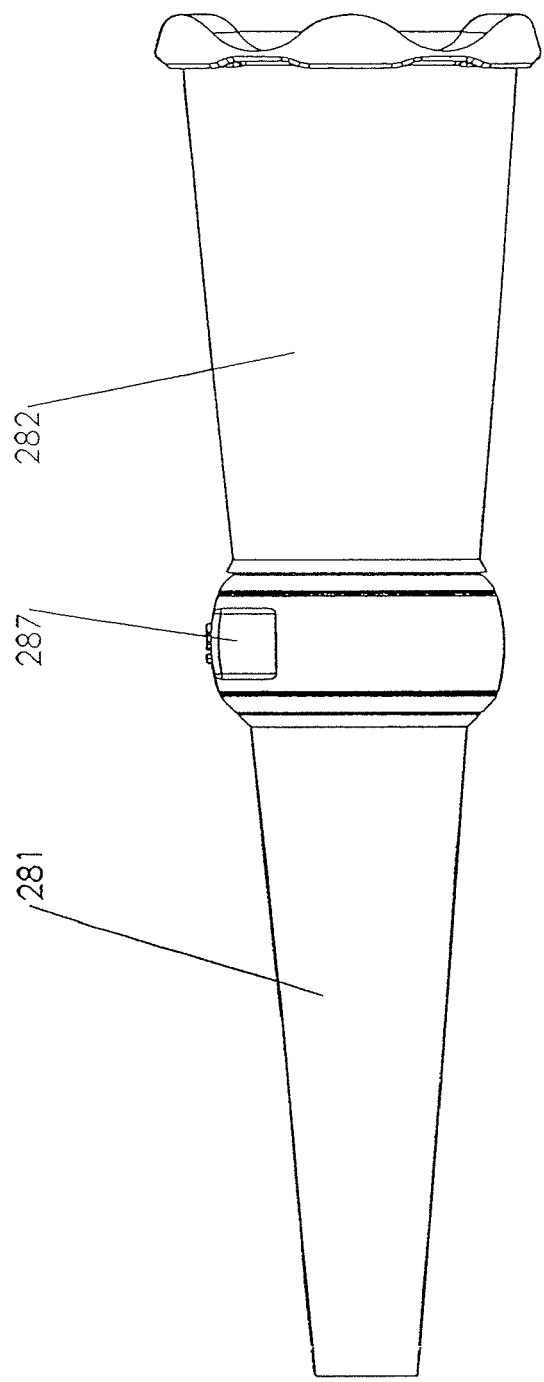
FIG. 43 shows in side elevation the components of FIG. 42.

Referring now to FIG. 41, there is shown a pipe/tube assembly 280 comprising pipe components 281, 282, 283 and 284, as well as key connectors 286, 287 and 288 for connecting the pipe components 281-284 together. These are made, for example, of metal, an alloy, steel, polyurethane, plastics material, composites (such as but not limited to glass, aramid or carbon fibre reinforced materials), ceramics or rubber or any combination of these either as separate components for assembly or as one component by way of welding, machining, casting, molding, co-molding or similar methods.

Figure 44:
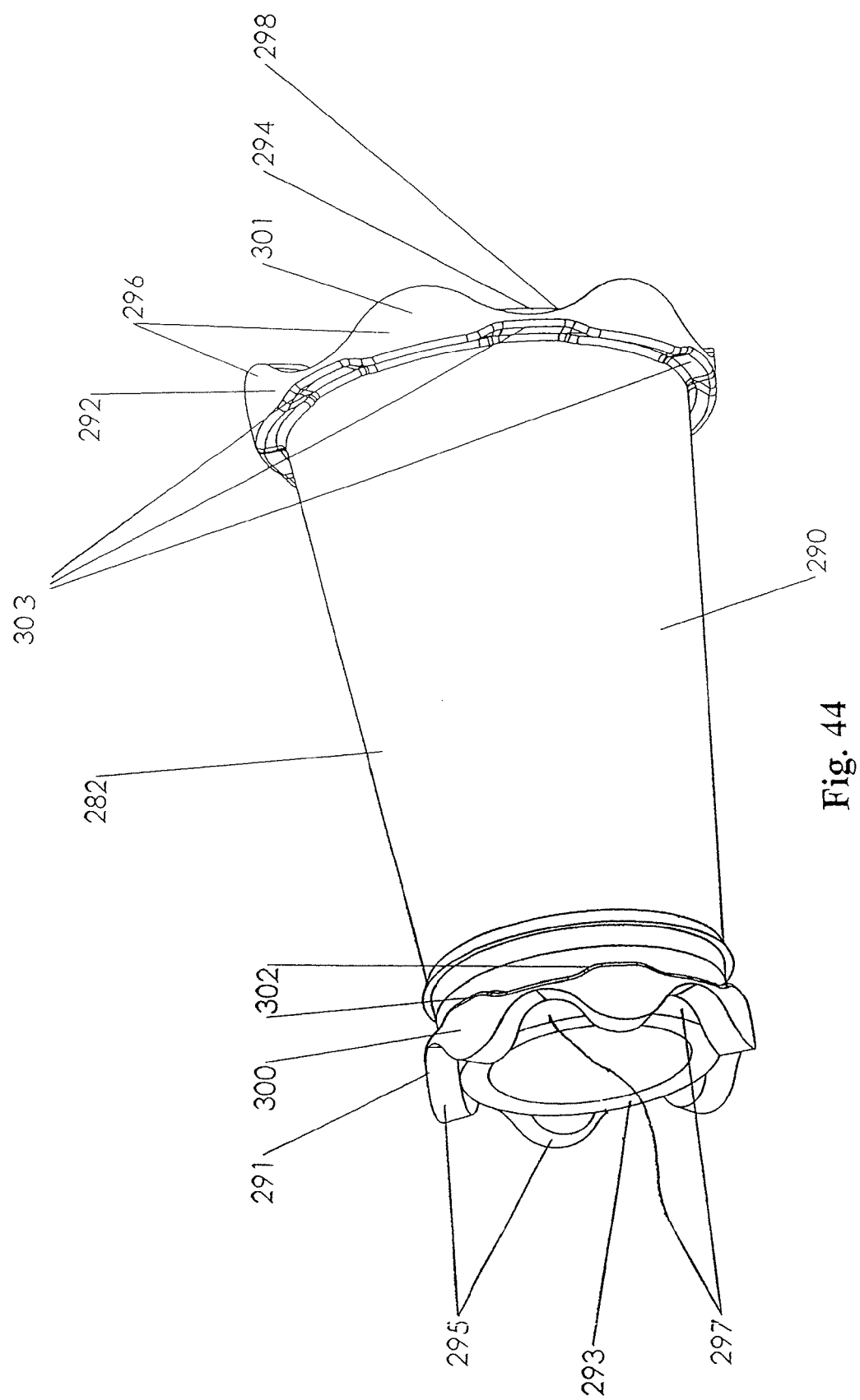
FIG. 44 shows in perspective a pipe/tube component as shown in FIGS. 41-43.

Pipe component 282 is shown in greater detail in FIG. 44. The pipe component 282 comprises a pipe body 290 and a sine waveform key arrangement 291, 292 located adjacent each end 293, 294 of the pipe body 290. Each key arrangement 291, 292 has the general appearance of a sine waveform, having peaks 295, 296 that overhang the ends 293, 294 of the pipe body 290 and troughs 297, 298 that are recessed relative to the ends 293, 294 of the pipe body 290. Each key arrangement 291, 292 comprises an annular sine waveform shaped body 300, 301 and keys 302, 303 extending from the body 300, 301.

Pipe component 281 and pipe component 283 each have a sine waveform key arrangement (not shown) that is similar to key arrangements 291 and 292. In fact, when pipe component 282 abuts pipe components 281 and 283, the respective peaks of the pipe components 281, 282, 283 locate within the respective troughs and the peaks are backed by the abutting ends of the pipe bodies. In this way, the peaks and troughs help orientate the pipe components relative to one another and more positively connect the components together.

The key connectors 286, 287, 288 are essentially the same as key connector 205 of FIG. 37, except that the key retaining hooks are specifically shaped to retain keys 302, 303 of the pipe components 281-284.

Pipe component 283 may be connected to pipe component 284 in a manner similar to that described above.

The profiles shown in FIG. 23 also represent longitudinal pipe/tube component cross sections, showing how abutting ends of two pipes/tube components may be connected to together.

Referring now to FIG. 45, there is shown a split pipe component 300 having a split pipe body 308 and two key arrangements 301, 302 according to another embodiment of the invention.

Each key arrangement 301, 302 comprises a longitudinal body 303, 304 extending along a length of the split pipe body 308 and a plurality of a regularly spaced keys 305, 306 extending from the body 303, 304. The keys 305, 306 extend away from one another.

FIGS. 48 and 49 show a key connector 310 for connecting together the two key arrangements 301, 302 shown in FIG. 45, according to an embodiment of the present invention.

The key connector 310 has a longitudinal body 311 with turned-over edges (side walls) which provide an internal keyway passage 312. A series of regularly spaced key-retaining hooks 313 extend from the side walls. These hooks 313 can engage the keys 305, 306 of the key arrangement 301, 302 by first extending the key connector 310 over the keys 305, 306 and then sliding the key connector 310 relative to the keys 305, 306.

Figure 50:
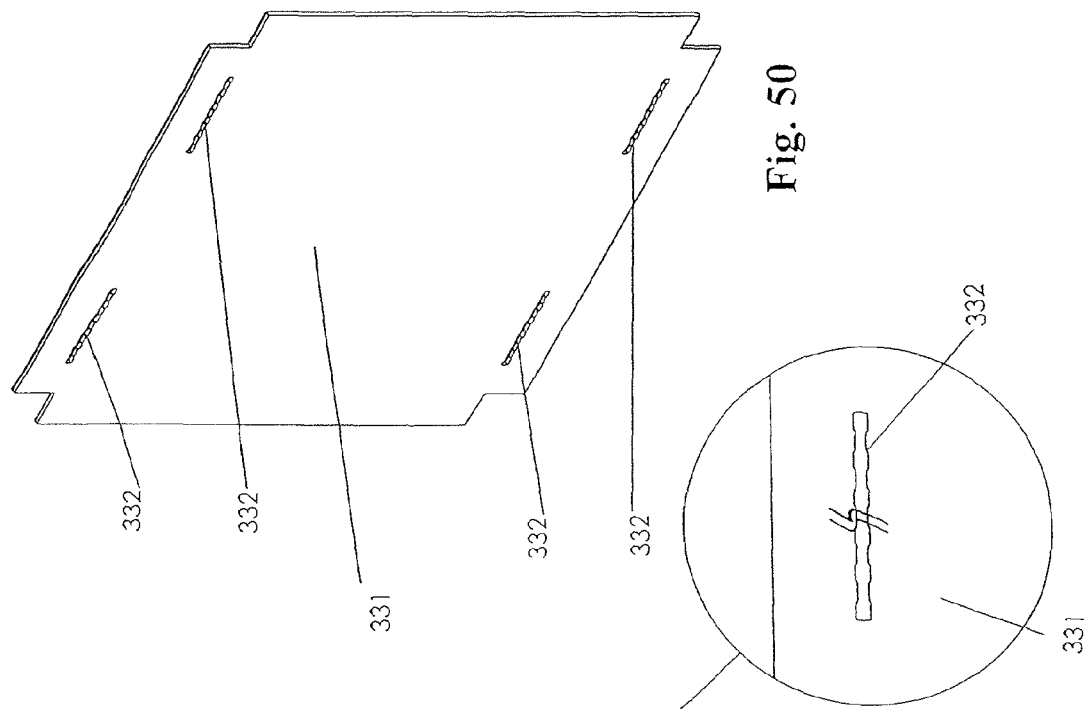
FIG. 50 is a perspective view of a key connector for connecting together the two key arrangements shown in FIG. 45, according to another embodiment of the present invention.
Figure 51:
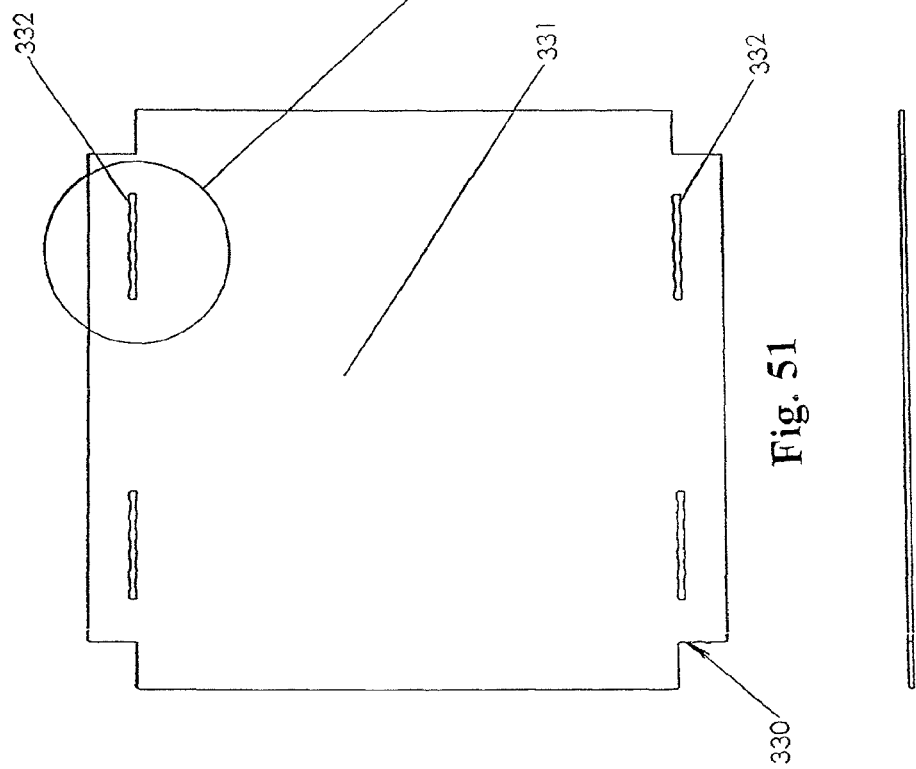
FIG. 51 is a plan view and detailed view of the key connector shown in FIG. 50.

Referring now to FIGS. 50 and 51, there is shown a key connector 330 for connecting together the two key arrangements 301, 302 shown in FIG. 45, according to an embodiment of the present invention.

This type of key connector 330 comprises a planar body 331 and a cutout or recess 332 in the body 331 that forms a keyway passage 332. The key connector 330 is shown here as having four keyway passages 332 for illustration only and there may in fact be any number of key passages 332. The cutout or recess 332 has undulating edges that serve as hooks for engaging the keys 305, 306 of the key arrangement 301, 302. These hooks can engage the keys 305, 306 of the key arrangement 301, 302 by first extending the cutout or recess 332 over the keys 305, 306 and then sliding the key connector 330 relative to the keys 305, 306. If the keyway passage 332 is provided by a recess 332, this can be moulded or machined into the planar body 331. The key passage 332 may be fully enclosed from the opposing side of 331, providing protection to keys 305, 306 of the key arrangement 301, 302 and enabling the mechanism to only be visible from the one side of 300.

Referring now to FIGS. 52-62, there is shown a pipe (tube) assembly 400 comprising two flanged pipe components 401, 402 each having a key arrangement 403, 404, plus a key connector 405 for connecting the pipe components 401, 402 together. These are made, for example, of metal, an alloy, steel, polyurethane, plastics material, composites (such as but not limited to glass, aramid or carbon fibre reinforced materials), ceramics or rubber or any combination of these either as separate components for assembly or as one component by way of welding, machining, casting, molding, co-molding or similar methods.

In this embodiment, the pipe 401, 402 flanges and key arrangements 403, 404 are one and the same, although this need not be the case. (See FIG. 37, for example.) A joining face of flange/key arrangement 403 has an inner region 450 and an outer region 451 (outer perimeter), and these regions 450, 451 are stepped relative to each other. A joining face of flange/key arrangement 404 also has an inner region 452 and an outer region 453 (outer perimeter), and these regions 452, 453 are stepped relative to each other (See FIGS. 55, 56 and 59) and may or may not include attachable, detachable or incorporated alignment pins, lugs or mating profiles between regions 452, 453 and 450, 451 to assist with mating alignment and positioning during assembly. Preferably alignment pins, lugs or mating profiles are present so as to prevent pipes 401 and 402 from simply rotating within key connector 405.

In addition, the joining face of flange/key arrangement 404 has an annular groove 454 extending within the outer region 453, for receiving an O-ring or similar sealing member. When connecting the pipes 401, 402 together, the inner region 452 of pipe 402 nests within the inner region 450 of pipe 401, thereby both orientating the pipes 401, 402 relative to one another and more positively connecting the flanges 403, 404 together (as seen in FIG. 55).

As seen in FIGS. 56-59, key arrangement 404 has an annular body 407 and regularly spaced keys 409 extend from a circumference of the body 407.

Figure 52:
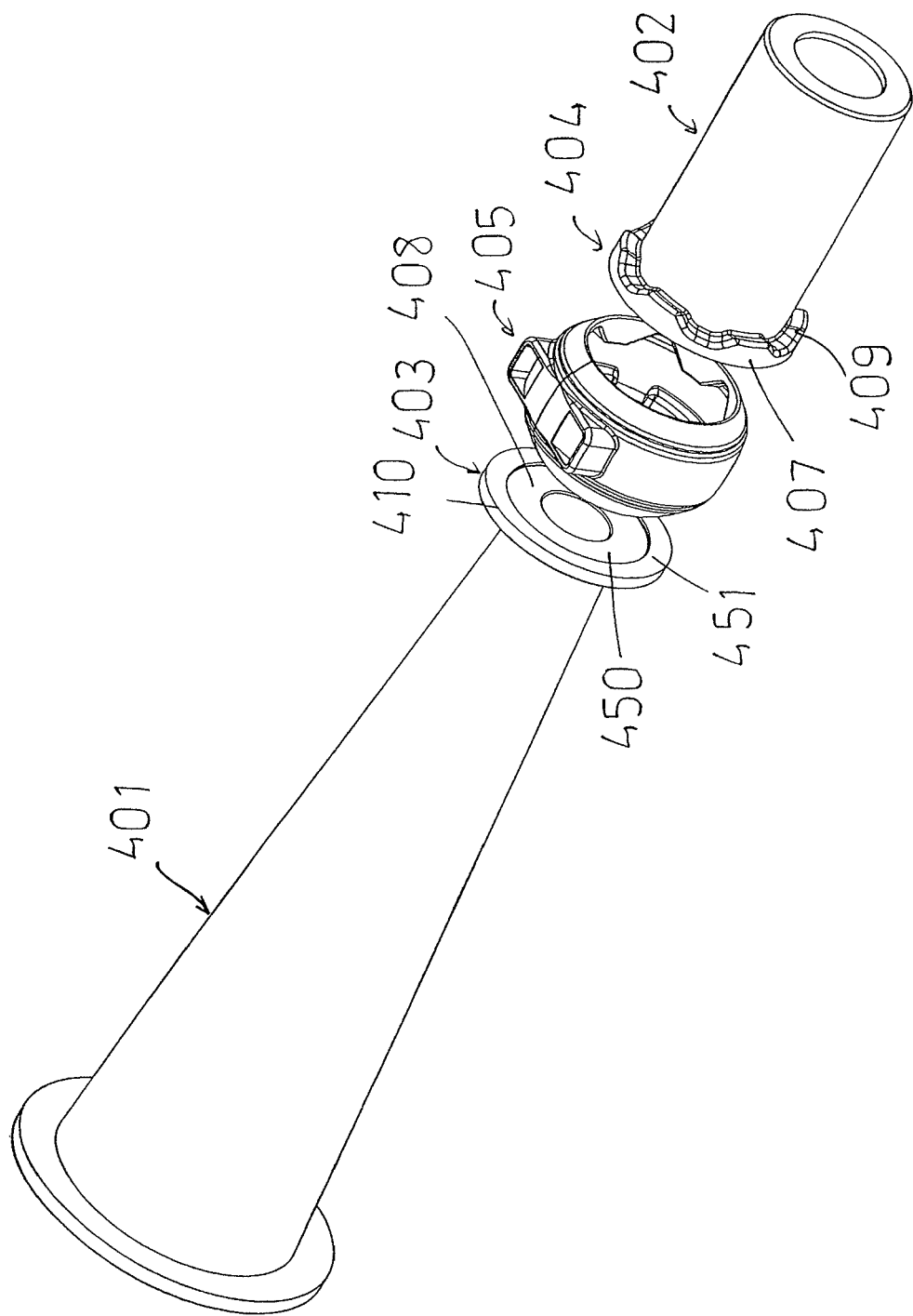
FIG. 52 is an exploded perspective view of a pipe/tube assembly comprising two pipe/tube components each having a key arrangement, plus a key connector for connecting the components together, according to an embodiment of the present invention.

As seen in FIGS. 52 and 55, key arrangement 403 has, in essence, an annular body 408 and a single continuous key 410 extending from (or continuous with) a circumference of the body 408.

Figure 60:
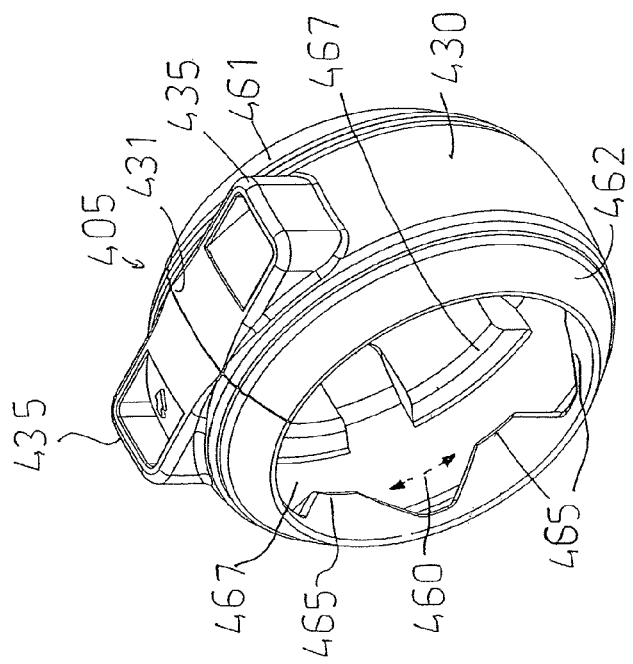
FIG. 60 shows in perspective a key connector of the pipe/tube assembly shown in FIG. 52.
Figure 61:
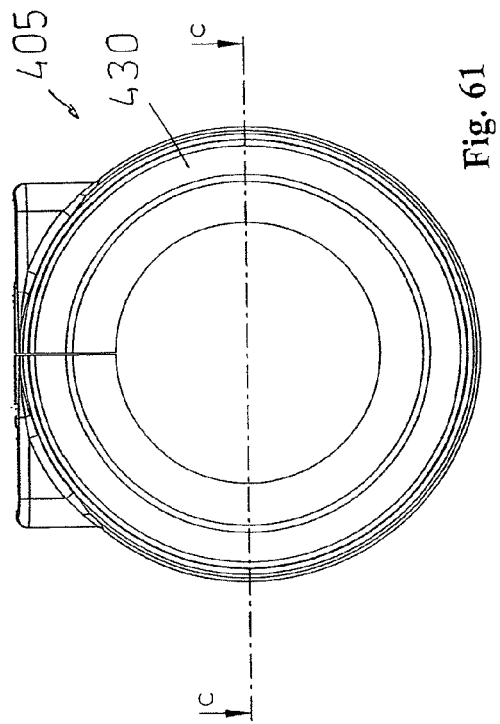
FIG. 61 is an end view of the key connector shown in FIG. 60.
Figure 62:
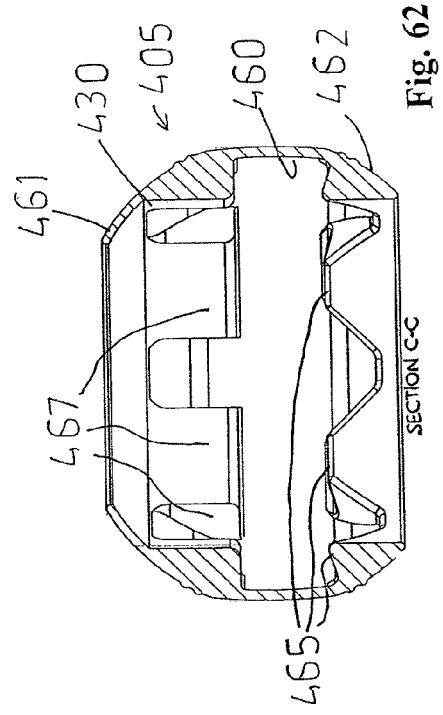
FIG. 62 is a cross sectional view of the key connector shown in FIG. 61, taken through plane C-C.

As seen in FIGS. 60-62, key connector 405 comprises a longitudinal annular body 430 in the shape of a split (431) ring 430 (or possibly half-segments or multiple segments), and a longitudinal keyway passage 460 extending between longitudinal sides 461, 462 of the body 430. A pair of handles/lugs/finger grips/tool slots 435 extends from the body 430.

One longitudinal side 462 of the body 430 has a series of key retainers 465 in the form of spaced hooks 465. The hooks 465 extend in a common plane and are regularly spaced from one another. The spacing of hooks 465 matches the spacing of keys 409. Each key 409 also is in the form of a hook that engages a key retainer hook 465 of the key connector 405.

The other longitudinal side 461 has a series of key retainers 467 in the form of spaced nodes 467. The key retainers/nodes 467 extend in a common plane and are regularly spaced from one another. The nodes 467 engage the single key 410 of key arrangement 403, although it is to be appreciated that the single key 410 could be two or more spaced individual keys.

As seen in FIGS. 52 and 55, the key arrangement 403, 404 of each pipe 401, 402 can be aligned such that aligned keys 409, 410 of the flanges/key arrangements 403, 404 extend generally in line with a common axis and the end of each pipe 401, 402 abuts. In order to clamp the pipes 401, 402 together, the key connector 405 body 430 is extended over a pipe 402 and aligned keys 409, 410 generally in line with the common axis so that the keys 409, 410 extend within the keyway passage 460 and are retained by the hooks 465 and nodes 467 of the key connector 405.

Figure 63:
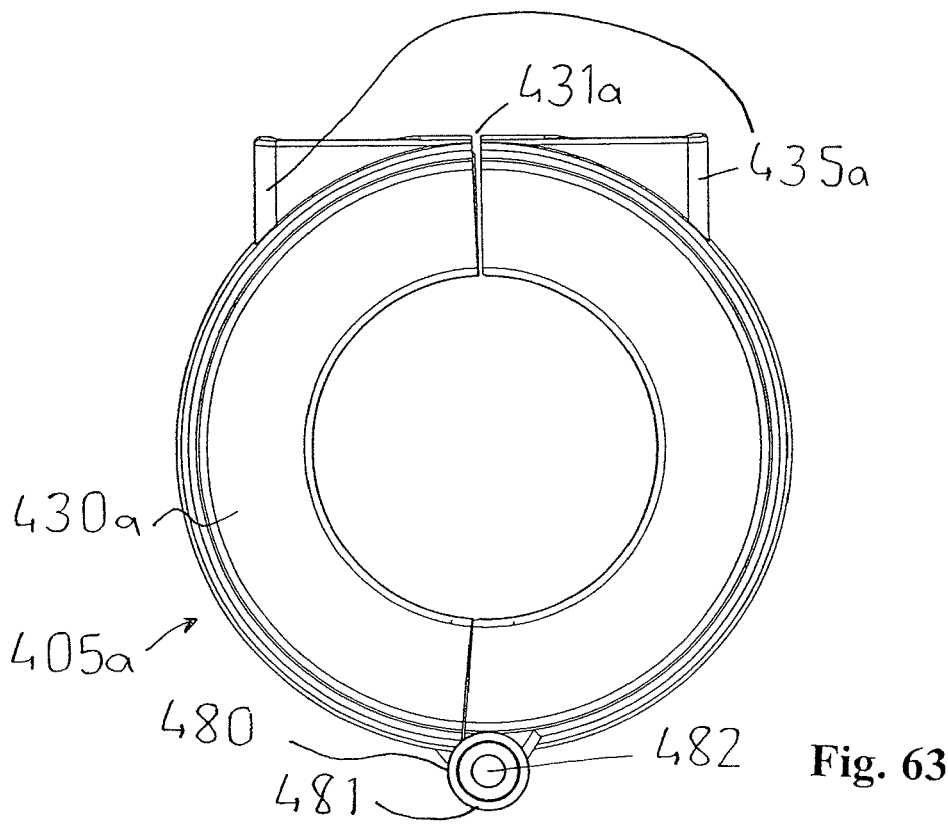
FIG. 63 is an end view of a key connector like the one shown in FIG. 60, according to another embodiment of the present invention.
Figure 64:
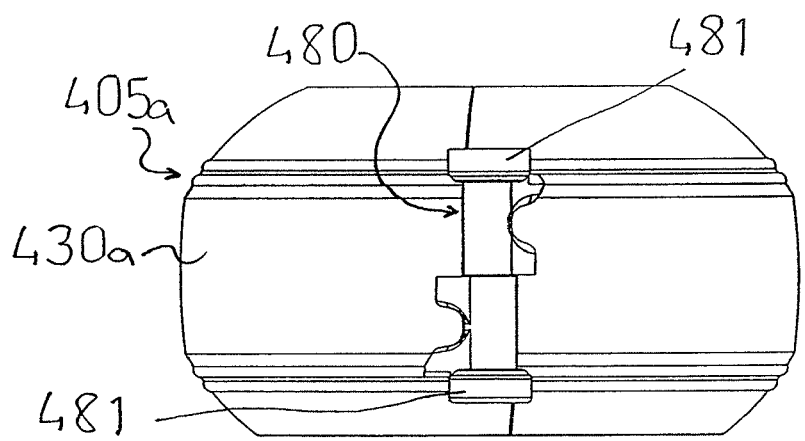
FIG. 64 is an end view of the key connector shown in FIG. 63.

The split 431 enables the annular body 430 to be flexed laterally such that the hooks 465 and nodes 467 of the key connector 405 can engage the keys 409, 410. This may be achieved by way of manufacturing the body 430 using a suitable flexible material as seen in FIG. 60 or alternatively may be achieved by using a more rigid material for the body 430a and incorporating at least one hinge mechanism 480 (comprising a yoke 481 and a rigid or flexible hinge pin 482) to enable the opening and closing of the two or more segments laterally, as seen in FIGS. 63 and 64. Other features of the key connector 405a that are shown in FIGS. 63 and 64 are similar to those of key connector 405 and are thus labelled similarly.)

Once the keys 409, 410 extend within the keyway passage 460, it can be slid/rotated relative to the keys 409, 410 until the keys 409 engage the hooks 465 of the key connector 405 and are retained by those hooks 465 so as to lock the pipes 401, 402 together—essentially as described for the embodiment shown in FIG. 37.

As can be gleaned from the figures, one chief difference of assembly 400 from the embodiment shown in FIG. 37 is that one of the key arrangements 403 has a single key 410 and it need not be hooked, thereby somewhat simplifying the connecting mechanism. This also reduces or removes altogether the requirement for alignment position of keys 409, relative to the single key 410. That is, one main advantage enabled by the features of the single-key version shown in FIGS. 52-64 is that the two components being joined together need not be perfectly aligned in a manner such that the keys/lugs/nodes on either side of the joint are aligned relative to each other. Another main advantage is that the connecting mechanism can be retrofitted to existing flanges, grooves, etc already in place by traditional means (eg: bolted-flange connections, grooved retaining connections and others). For example, in FIG. 37 you would not require key arrangement 204, therefore reducing the number of parts and the ease of (say) retrofitting to an existing flanged pipe end.

Referring now to FIGS. 65-69, there is shown a split pipe component 500 having a split pipe body 508 and two key arrangements 501, 502 plus a key connector 510, according to another embodiment of the invention.

Each key arrangement 501, 502 comprises a longitudinal body 503, 504 extending along a length of the split pipe body 508 and a plurality of a regularly spaced keys 505, 506 extending from the body 503, 504. Opposing keys 505, 506 are offset relative to one another and extend away from one another.

FIGS. 68 and 69 show the key connector 510 for connecting together the two key arrangements 501, 502 shown in FIG. 65. The key connector 510 has a longitudinal body 511 with turned-over edges (side walls) which provide an internal keyway passage 512. A series of regularly spaced key-retaining hooks 513 extend from the side walls. These hooks 513 can engage the keys 505, 506 of the key arrangement 501, 502 by first extending the key connector 510 over the keys 505, 506 and then sliding the key connector 510 relative to the keys 505, 506. Opposed hooks 513 are offset relative to each other. Both the keys 505, 506 and hooks 513 have on one or both ends thereof a smooth rounded, arcuate, filleted, tapered, chamfered or angular lead-in edge or surface 515, 516.

Figure 70:
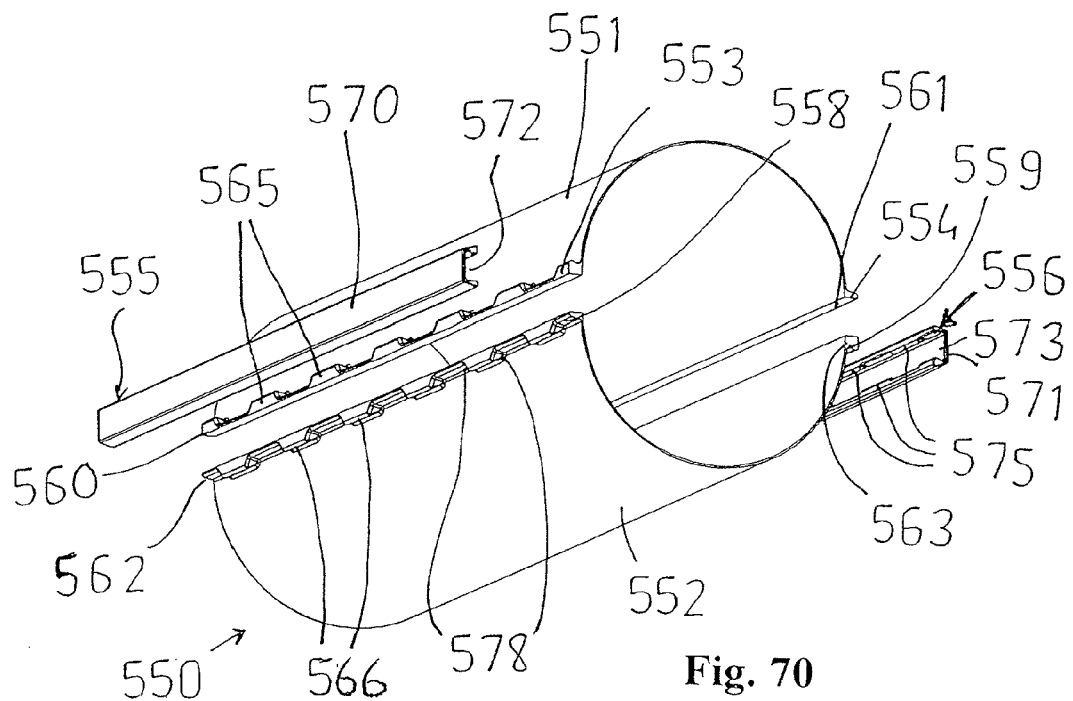
FIG. 70 is an exploded perspective view of a pipe/tube assembly comprising two half pipe/tube components with each half having two key arrangements, plus two key connectors for connecting the halves together, according to an embodiment of the present invention.
Figure 71:
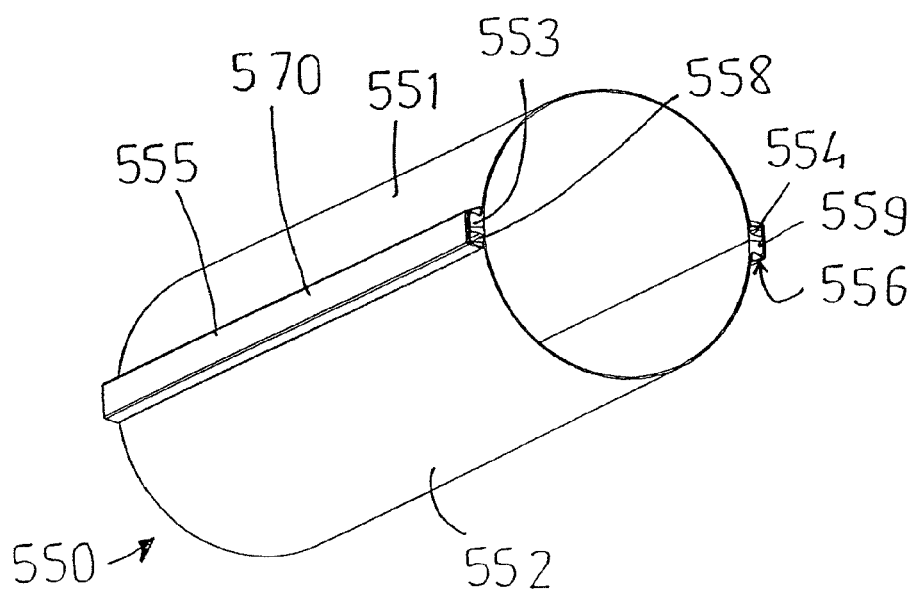
FIG. 71 shows the pipe/tube assembly of FIG. 70 when fully assembled.

Referring now to FIGS. 70 and 71, there is shown a pipe/tube assembly 550 comprising two half pipe/tube components 551, 552, each half 551, 552 having two key arrangements 553, 554, 558, 559 plus two key connectors 555, 556 for connecting the halves 551, 552 together, according to an embodiment of the present invention.

Each key arrangement 553, 554, 558, 559 comprises a longitudinal body 560, 561, 562, 563 extending along a length of each half 551, 552 and a plurality of a regularly spaced keys 565, 566 (not all are visible) extending from the body 560, 561, 562, 563. Opposing keys 565, 566 are offset relative to one another and extend away from one another.

Each key connector 555, 556 has a longitudinal body 570, 571 with turned-over edges (side walls) which provide an internal keyway passage 572, 573. A series of regularly spaced key-retaining hooks 575 (only some can be seen) extend from the side walls of each key connector 555, 556. These hooks 575 can engage the keys 565, 566 of the key arrangements 553, 554, 558, 559 by first extending each key connector 555, 556 over the keys 565, 566 and then sliding each key connector 555, 556 relative to the keys 565, 566. Opposed hooks 575 are offset relative to each other. Both the keys 565, 566 and hooks 575 have on one or both ends thereof a smooth rounded, arcuate, filleted, tapered, chamfered or angular lead-in edge or surface 578 (but not all can be seen nor are labelled).

Figure 72:
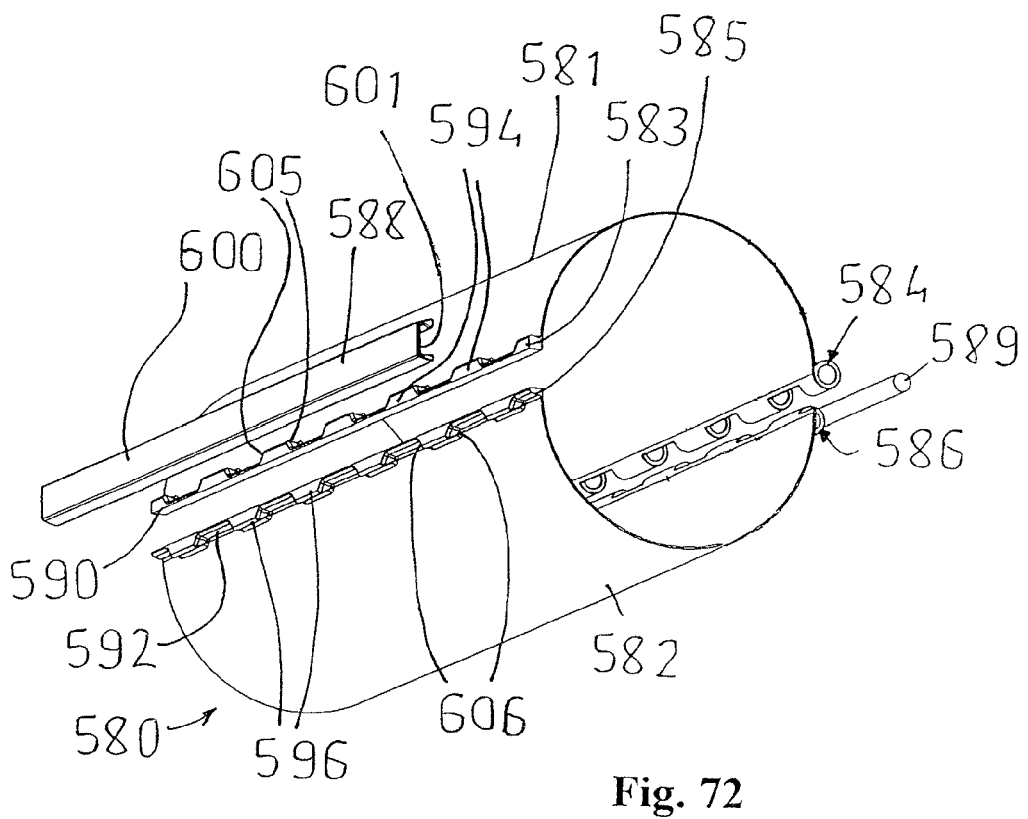
FIG. 72 is an exploded perspective view of a pipe/tube assembly comprising two half pipe/tube components with each half having a mating hinge mechanism, one key arrangement, plus one key connectors for connecting the hinged halves together, according to an embodiment of the present invention.
Figure 73:
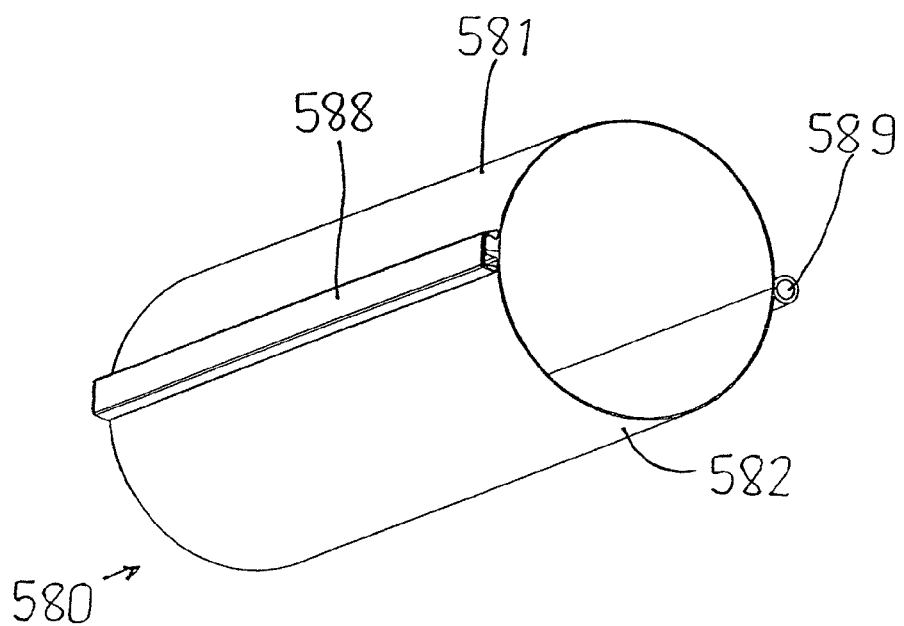
FIG. 73 shows the pipe/tube assembly of FIG. 72 when fully assembled.

Referring now to FIGS. 72 and 73, there is shown a pipe/tube assembly 580 comprising two half pipe/tube components 581, 582 with each half 581, 582 having a key arrangement 583, 585, a key connector 588 for connecting the halves 581, 582 together, and a hinge mechanism 584, 586, 589, according to an embodiment of the present invention.

Each key arrangement 583, 585 comprises a longitudinal body 590, 592 extending along a length of each half 581, 582 and a plurality of a regularly spaced keys 594, 596 (not all are labelled) extending from the body 590, 592. Opposing keys 594, 596 are offset relative to one another. Keys 594 and 596 are in the form of hooks that extend away from one another.

Key connector 588 has a longitudinal body 600 with turned-over edges (side walls) which provide an internal keyway passage 601. A series of regularly spaced key-retaining hooks (not visible) extend from the side walls of the key connector 588. These hooks can engage the keys 594, 596 of the key arrangements 583, 585 by first extending the key connector 588 over the keys 594, 596 and then sliding the key connector 588 relative to the keys 594, 594. Opposed hooks 594, 596 are offset relative to each other. Both the keys 594, 596 and hooks have on one or both ends thereof a smooth rounded, arcuate, filleted, tapered, chamfered or angular lead-in edge or surface 605, 606 (but not all can be seen nor are labelled).

The hinge mechanism 584, 586, 589 comprises two collar arrangements 584, 586 and a hinge pin 589. A first arrangement of collars 584 extends along a length of half 581, and a second arrangement of collars 584 extends along a length of half 582. These collars 584, 586 can intermesh and be connected together using the hinge pin 589, as shown in FIG. 73. In this way, the two halves 581, 582 are hinged to one another and can be rotated about the hinge pin 589 between a closed configuration as shown in FIG. 73 and an open configuration, essentially as shown in FIG. 72.

The advantages of the present invention as generally described and/or exemplified in one or more of the figures include:

1. The present invention provides advantages of singular mechanical clamps, clips, wedges or brackets by providing a uniformly loaded joint without localised, high stress point-loads.

2. The uniform loading along the entire length of the joint of the present invention can also provide the important advantages of requiring lighter and less costly parent materials to withstand the required loads applied to the joints therefore reducing costs, materials wastage and need for specialised lifting/assembly equipment.

3. The present invention can have as little as one loose component (key strip) to lock an entire joint that is applied and assembled in one action making the present invention faster, easier and more efficient than existing methods such as single mechanical clamps, clips, wedges or brackets.

4. The present invention can enable more efficient, re-usable joint designs therefore enabling re-use of components and access.

5. Very versatile system that can be easily adapted to benefit a broad range of applications and products.

6. The joint and the components and geometry of the connecting method is fully enclosed thus providing advantages such as being a more aesthetically pleasing joint, inherently tamper-proof and also protecting the joint geometry from ingress of fluid, particles or other foreign matter.

7. The present invention fundamentally differs from a traditional dove-tail assembly joint as during the simple assembly of the components, the smooth rounded, arcuate, filleted, tapered, chamfered or angular lead-in edges of each key and key retainer are designed to provide the desired tensioning force to pull the two or more components together to provide a strong, secure and if required, sealed joint.

8. The present invention is easily adapted and suitable for fitment to existing or traditional components incorporating existing flanges or grooves allowing the advantages of the present invention to be readily utilized into existing components and applications.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

The invention claimed is:

1. A method of connecting at least a first component and a second component together to form a joint, wherein each said component comprises at least one key arrangement comprising a plurality of keys extending along the component and keys of the key arrangement are spaced apart from one another, said method comprising the steps of:

aligning the at least one key arrangement of the first and second components in a predetermined fixed orientation to one another such that aligned keys of the key arrangements extend generally in line with a common axis or ensuring alignment of the key arrangements of the first and second components in a predetermined orientation to one another such that aligned keys of the key arrangements extend generally in line with a common axis; and extending and moving a key connector comprising a longitudinal keyway passage over the aligned keys in the predetermined orientation generally in line with the common axis so that all of the keys extend within the keyway passage, are retained by the key connector, and the first and second components in the predetermined orientation directly abut each other and are clamped together to form a joint under sufficient load, wherein:

the key connector has an elongate body having longitudinal sides, the longitudinal keyway passage extends along a length of the body between the longitudinal sides, each longitudinal side has a plurality of hooked key retainers having key-engaging surfaces, the hooked key retainers of a first said side are identically spaced from the common axis when the first and second components are clamped together, and the hooked key retainers of a second said side are identically spaced from the common axis when the first and second components are clamped together;

said keys individually engage and are hooked by individual said hooked key retainers such that the key-engaging surfaces extend in line with the common axis when the first and second components are clamped together and the joint is under sufficient load;

said key connector applies a compressive force on said keys towards the common axis when the first and second components are clamped together;

said keys and/or hooked key retainers have lead-in edges or surfaces for assisting with individual engagement of said keys with said hooked key retainers for placing the joint under sufficient load; and said keys are adapted to slide relative to the key connector within the keyway passage in a first direction and a second direction that is opposite to the first direction, and each said key is adapted to slide within the keyway passage in both the first and second directions by a distance equal to one hooked key retainer length out of locking engagement with a respective said hooked key retainer.

2. The method of claim 1, wherein the at least one key arrangement of said first and second components has the general appearance of a sine, square, triangle or sawtooth waveform, having both peaks and troughs.

3. The method of claim 1, wherein the keys of the key arrangements intermesh with one another.

4. The method of claim 1, wherein the longitudinal keyway passage extends the entire length of the body.

5. The method of claim 1, wherein the hooked key retainers alternate in position from one said longitudinal side of the body to the other along the length of the elongate body.

6. The method of claim 1, wherein the hooked key retainers of one said longitudinal side of the body directly oppose hooked key retainers of the other longitudinal side of the body.

7. The method of claim 1, wherein the key connector is removable from clamping engagement with the keys in a lateral direction between the keys when not in locking engagement with the keys.

8. The method of claim 1, wherein the first component is in the form of a container and the second component is in the form of a closure for the container.

9. The method of claim 1, wherein the first component is in the form of a wall section of a tank and the second component is in the form of a base connectable to the wall section of the tank.

10. The method of claim 1, wherein the first and second components are in the form of panels or beams that are connectable edge to edge or face to face such that the panels or beams extend substantially in the same plane or at different angles relative to one another.

11. The method of claim 1, wherein the first and second components are in the form of tubular members that are connectable edge to edge or end to end.

12. The method of claim 1, wherein each said hooked key retainer and each said key comprises a said lead-in edge or surface that is smooth rounded, arcuate, filleted, tapered, chamfered or angular.

13. The method of claim 1, wherein the at least one key arrangement of the first component is detachably connected to a remainder of the first component.

14. The method of claim 1, wherein the at least one key arrangement of the second component is detachably connected to a reminder of the second component.

* * * * *